United States Patent
Chen et al.

(10) Patent No.: US 12,318,775 B2
(45) Date of Patent: Jun. 3, 2025

(54) LATERAL LOADING OF MICROCAPILLARY ARRAYS

(71) Applicant: XCELLA BIOSCIENCES, INC., Emeryville, CA (US)

(72) Inventors: Bob Chen, Menlo Park, CA (US); Ming X. Tan, San Bruno, CA (US); Arturo M. Escajeda, Oakland, CA (US)

(73) Assignee: XCELLA BIOSCIENCES, INC., Emeryville, CA (US)

( * ) Notice: Subject to any disclaimer, the term of this patent is extended or adjusted under 35 U.S.C. 154(b) by 0 days.

(21) Appl. No.: 16/705,047

(22) Filed: Dec. 5, 2019

(65) Prior Publication Data
US 2020/0316593 A1  Oct. 8, 2020

Related U.S. Application Data

(60) Provisional application No. 62/776,374, filed on Dec. 6, 2018.

(51) Int. Cl.
*B01L 3/00* (2006.01)
*B01L 9/00* (2006.01)
*G01N 21/64* (2006.01)

(52) U.S. Cl.
CPC ..... *B01L 3/502715* (2013.01); *B01L 3/50273* (2013.01); *B01L 9/52* (2013.01); *G01N 21/6428* (2013.01); *B01L 2200/0684* (2013.01); *B01L 2200/16* (2013.01); *B01L 2300/041* (2013.01); *B01L 2300/048* (2013.01); *B01L 2300/06* (2013.01); *B01L 2300/0819* (2013.01); *B01L 2300/0829* (2013.01);
(Continued)

(58) Field of Classification Search
None
See application file for complete search history.

(56) References Cited

U.S. PATENT DOCUMENTS

| 4,004,150 A | 1/1977 | Natelson |
|---|---|---|
| 4,017,185 A | 4/1977 | Chupp |

(Continued)

FOREIGN PATENT DOCUMENTS

| AU | 6027873 | 3/1975 |
|---|---|---|
| CA | 994009 | 7/1976 |

(Continued)

OTHER PUBLICATIONS

International Search Report and Written Opinion mailed Apr. 7, 2020 in International Application No. PCT/US2019/064774, in 18 pages.

(Continued)

*Primary Examiner* — Matthew D Krcha
(74) *Attorney, Agent, or Firm* — Knobbe, Martens, Olson & Bear, LLP

(57) ABSTRACT

Lateral loading methods of use in high-throughput methods for screening large populations of variant proteins are provided. The methods utilize a flow cell encompassing large-scale arrays of microcapillaries, where each microcapillary comprises a solution containing a variant protein, an immobilized target molecule, and a reporter element. Immobilized target molecules may include any molecule of interest, including proteins, nucleic acids, carbohydrates, and other biomolecules.

29 Claims, 17 Drawing Sheets

(52) U.S. Cl.
CPC ... *B01L 2300/0851* (2013.01); *B01L 2300/12* (2013.01); *B01L 2400/049* (2013.01); *G01N 2021/6439* (2013.01)

(56) References Cited

U.S. PATENT DOCUMENTS

| | | | |
|---|---|---|---|
| 4,111,754 A | 9/1978 | Park | |
| 4,498,782 A | 2/1985 | Proctor et al. | |
| 4,621,059 A | 11/1986 | Rokugawa | |
| 4,762,420 A | 8/1988 | Bowley | |
| 4,960,566 A | 10/1990 | Mochida | |
| 4,968,148 A | 11/1990 | Chow et al. | |
| 5,072,382 A | 12/1991 | Kamentsky | |
| 5,073,029 A | 12/1991 | Eberly et al. | |
| 5,112,134 A | 5/1992 | Chow et al. | |
| 5,262,129 A | 11/1993 | Terada et al. | |
| 5,265,169 A | 11/1993 | Ohta et al. | |
| 5,389,555 A | 2/1995 | Watanabe et al. | |
| 5,675,155 A | 10/1997 | Pentoney et al. | |
| 5,730,187 A | 3/1998 | Howitz et al. | |
| 5,763,263 A | 6/1998 | Dehlinger | |
| 5,766,875 A | 6/1998 | Hafeman et al. | |
| 5,774,214 A | 6/1998 | Prettyjohns | |
| 5,843,767 A | 12/1998 | Beattie | |
| 5,854,684 A | 12/1998 | Stabile et al. | |
| 6,027,873 A | 2/2000 | Schellenberger et al. | |
| 6,071,748 A | 6/2000 | Modlin et al. | |
| 6,143,496 A * | 11/2000 | Brown | B01L 3/5027 422/504 |
| 6,174,673 B1 | 1/2001 | Short et al. | |
| 6,246,525 B1 | 6/2001 | Ikami | |
| 6,306,578 B1 | 10/2001 | Schellenberger et al. | |
| 6,345,115 B1 | 2/2002 | Ramm et al. | |
| 6,377,721 B1 | 4/2002 | Walt et al. | |
| 6,387,331 B1 | 5/2002 | Hunter et al. | |
| 6,436,632 B2 | 8/2002 | Schellenberger et al. | |
| 6,441,973 B1 | 8/2002 | Walt et al. | |
| 6,496,309 B1 | 12/2002 | Bliton et al. | |
| 6,544,480 B1 | 4/2003 | Velghe et al. | |
| 6,547,941 B2 | 4/2003 | Kopf et al. | |
| 6,586,257 B1 | 7/2003 | Vuong | |
| 6,716,629 B2 | 4/2004 | Hess et al. | |
| 6,743,633 B1 | 6/2004 | Hunter | |
| 6,794,127 B1 | 9/2004 | Lafferty et al. | |
| 6,816,257 B2 | 11/2004 | Goix | |
| 6,823,079 B1 | 11/2004 | Winterot et al. | |
| 6,838,680 B2 | 1/2005 | Maher et al. | |
| 6,866,824 B2 | 3/2005 | Lafferty et al. | |
| 6,881,312 B2 | 4/2005 | Kopf et al. | |
| 6,893,877 B2 | 5/2005 | Hunter et al. | |
| 6,907,798 B2 | 6/2005 | Ganser et al. | |
| 6,972,183 B1 | 12/2005 | Lafferty et al. | |
| 6,977,723 B2 | 12/2005 | Lemmo et al. | |
| 7,012,676 B2 | 3/2006 | Baer et al. | |
| 7,019,827 B2 | 3/2006 | Laffert | |
| 7,105,132 B2 | 9/2006 | Shumate et al. | |
| 7,145,645 B2 | 12/2006 | Blumenfeld et al. | |
| 7,221,455 B2 | 5/2007 | Chediak et al. | |
| 7,272,510 B2 | 9/2007 | Hansen et al. | |
| 7,282,329 B2 | 10/2007 | Manalis et al. | |
| 7,289,217 B2 | 10/2007 | Boege et al. | |
| 7,387,891 B2 | 6/2008 | Boege et al. | |
| 7,403,280 B2 | 7/2008 | Belgel et al. | |
| 7,452,507 B2 | 11/2008 | Renzi et al. | |
| 7,547,556 B2 | 6/2009 | Hunter et al. | |
| 7,666,360 B2 | 2/2010 | Schellenberger et al. | |
| 7,666,630 B2 | 2/2010 | Yaver et al. | |
| 7,738,945 B2 | 6/2010 | Fauver et al. | |
| 7,807,108 B2 | 10/2010 | Fasulka | |
| 7,907,259 B2 | 3/2011 | Sägmüller et al. | |
| 7,933,004 B2 | 4/2011 | Sugita | |
| 8,029,745 B2 | 10/2011 | Hunter et al. | |
| 8,278,071 B2 | 10/2012 | Brown et al. | |
| 8,309,035 B2 | 11/2012 | Chen et al. | |
| 8,325,342 B2 | 12/2012 | Ali et al. | |
| 8,338,092 B2 | 12/2012 | Hofmann et al. | |
| 8,460,878 B2 | 6/2013 | Walt et al. | |
| 8,460,879 B2 | 6/2013 | Walt et al. | |
| 8,492,098 B2 | 7/2013 | Walt et al. | |
| 8,535,876 B2 | 9/2013 | Wesner | |
| 8,551,698 B2 | 10/2013 | Brown et al. | |
| 8,623,596 B2 | 1/2014 | Gandini et al. | |
| 8,664,002 B2 | 3/2014 | Yeung | |
| 8,673,218 B2 | 3/2014 | Jaffe et al. | |
| 8,679,853 B2 | 3/2014 | Bhullar et al. | |
| 8,722,357 B2 | 5/2014 | Baer et al. | |
| 8,785,883 B2 | 7/2014 | Nakazawa et al. | |
| 8,829,426 B2 | 9/2014 | Vertes et al. | |
| 8,936,762 B2 | 1/2015 | Ehrlich et al. | |
| 9,151,713 B2 | 10/2015 | Fan et al. | |
| 9,314,764 B2 | 4/2016 | Hess et al. | |
| 9,404,152 B2 | 8/2016 | Hasson et al. | |
| 9,657,290 B2 | 5/2017 | Dimov et al. | |
| 9,908,115 B2 | 3/2018 | Hobbs et al. | |
| 10,087,408 B2 | 10/2018 | Hansen et al. | |
| 10,227,583 B2 | 3/2019 | Cochran et al. | |
| D844,471 S | 4/2019 | Stone | |
| 11,085,039 B2 | 8/2021 | Cochran et al. | |
| 11,156,626 B2 | 10/2021 | Chen | |
| 11,473,081 B2 | 10/2022 | Cochran et al. | |
| 2002/0045270 A1 | 4/2002 | Schurenberg et al. | |
| 2002/0086322 A1 | 7/2002 | Yu | |
| 2003/0003500 A1 | 1/2003 | Lafferty et al. | |
| 2003/0044968 A1 | 3/2003 | Lafferty et al. | |
| 2003/0092194 A1 | 5/2003 | Gambini | |
| 2003/0096220 A1 | 5/2003 | Lafferty et al. | |
| 2003/0106997 A1 | 6/2003 | Beecher et al. | |
| 2003/0143580 A1 | 7/2003 | Straus et al. | |
| 2003/0168458 A1* | 9/2003 | Lafferty | B01L 3/5085 220/523 |
| 2003/0215798 A1 | 11/2003 | Short et al. | |
| 2003/0231989 A1 | 12/2003 | Schleifer et al. | |
| 2004/0005582 A1 | 1/2004 | Shipwash | |
| 2004/0070763 A1 | 4/2004 | Yeung et al. | |
| 2004/0248318 A1* | 12/2004 | Weinberger | B01L 3/502715 422/68.1 |
| 2005/0057749 A1 | 3/2005 | Dietz et al. | |
| 2005/0070005 A1 | 3/2005 | Keller et al. | |
| 2005/0079105 A1 | 4/2005 | Hunter et al. | |
| 2005/0287044 A1 | 12/2005 | Nataraj | |
| 2006/0257013 A1 | 11/2006 | Ramm | |
| 2006/0275847 A1 | 12/2006 | Goodyer | |
| 2007/0209574 A1* | 9/2007 | Hansen | C30B 29/58 117/11 |
| 2008/0062421 A1 | 3/2008 | Zhou | |
| 2009/0042744 A1 | 2/2009 | Wagner et al. | |
| 2009/0161100 A1 | 6/2009 | Minot et al. | |
| 2010/0008892 A1 | 1/2010 | Shankar et al. | |
| 2010/0252748 A1 | 10/2010 | Laitinen | |
| 2010/0261159 A1 | 10/2010 | Hess et al. | |
| 2011/0049385 A1 | 3/2011 | Laitinen | |
| 2011/0124520 A1 | 5/2011 | Love et al. | |
| 2011/0251105 A1 | 10/2011 | Walt et al. | |
| 2011/0294208 A1 | 12/2011 | Allbritton et al. | |
| 2012/0009671 A1 | 1/2012 | Hansen | |
| 2012/0013726 A1 | 1/2012 | Thorburn | |
| 2012/0015347 A1 | 1/2012 | Singhal | |
| 2012/0021951 A1 | 1/2012 | Hess et al. | |
| 2012/0064564 A1 | 3/2012 | Grassl | |
| 2012/0094851 A1 | 4/2012 | Schellenberger et al. | |
| 2012/0204906 A1 | 8/2012 | Bommarito | |
| 2012/0244749 A1 | 9/2012 | Xiao | |
| 2012/0321419 A1 | 12/2012 | Neeper | |
| 2013/0019006 A1 | 1/2013 | Drittler | |
| 2013/0190206 A1 | 7/2013 | Leonard et al. | |
| 2013/0190212 A1* | 7/2013 | Handique | B01L 3/021 506/37 |
| 2013/0196861 A1 | 8/2013 | Quake | |
| 2013/0220528 A1 | 8/2013 | Peng et al. | |
| 2013/0236905 A1 | 9/2013 | Marshall | |
| 2013/0237443 A1 | 9/2013 | Knebel et al. | |
| 2013/0260479 A1 | 10/2013 | Chou et al. | |
| 2014/0011690 A1 | 1/2014 | Dimov et al. | |
| 2014/0017700 A1 | 1/2014 | Fan et al. | |

(56) References Cited

U.S. PATENT DOCUMENTS

| | | | |
|---|---|---|---|
| 2014/0098214 A1 | 4/2014 | Schlaudraff et al. |
| 2014/0147884 A1 | 5/2014 | Schlaudraff et al. |
| 2014/0272984 A1 | 9/2014 | Hasson et al. |
| 2014/0329240 A1 | 11/2014 | Beer et al. |
| 2014/0329305 A1 | 11/2014 | Brown et al. |
| 2015/0051118 A1 | 2/2015 | Ghenciu et al. |
| 2015/0126412 A1 | 5/2015 | Hunter et al. |
| 2015/0323544 A1 | 11/2015 | Cambell et al. |
| 2015/0333471 A1 | 11/2015 | Chimmalgi et al. |
| 2016/0032404 A1 | 2/2016 | Schweighofer et al. |
| 2016/0202150 A1 | 7/2016 | Schlaudraff et al. |
| 2016/0215805 A1 | 8/2016 | Cochran et al. |
| 2016/0244749 A1 | 8/2016 | Cochran et al. |
| 2016/0245805 A1 | 8/2016 | Baer et al. |
| 2016/0305936 A1 | 10/2016 | Leonard et al. |
| 2016/0332133 A1 | 11/2016 | Hess et al. |
| 2018/0163198 A1 | 6/2018 | Cochran et al. |
| 2018/0164294 A1 | 6/2018 | Cochran et al. |
| 2018/0230534 A1 | 8/2018 | Chen et al. |
| 2018/0299379 A1 | 10/2018 | Chen |
| 2018/0363059 A1 | 12/2018 | Quake et al. |
| 2019/0040461 A1 | 2/2019 | Ryu et al. |
| 2019/0094113 A1 | 3/2019 | Huang et al. |
| 2019/0217297 A1 | 7/2019 | Lavieu et al. |
| 2020/0150119 A1 | 5/2020 | Singhal et al. |
| 2022/0043017 A1 | 2/2022 | Chen et al. |
| 2022/0162594 A1 | 5/2022 | Hsien |
| 2022/0373440 A1 | 11/2022 | Chen |
| 2023/0183676 A1 | 6/2023 | Cochran et al. |

FOREIGN PATENT DOCUMENTS

| | | |
|---|---|---|
| CN | 101529304 | 9/2009 |
| CN | 102348807 | 2/2012 |
| CN | 102445750 | 5/2012 |
| CN | 104656379 | 5/2015 |
| EP | 1 207 392 | 5/2002 |
| EP | 1 532 449 | 12/2010 |
| EP | 2 733 673 | 5/2014 |
| EP | 3 473 700 A1 | 4/2019 |
| JP | 2003-319778 | 11/2003 |
| JP | 2004-093558 | 3/2004 |
| JP | 2007-535484 | 12/2007 |
| JP | 2008-200037 | 9/2008 |
| JP | 2010-112955 | 5/2010 |
| JP | 2010-281595 | 12/2010 |
| JP | 2016-163549 | 9/2016 |
| JP | 2018-017657 | 2/2018 |
| JP | 2020-533004 | 3/2019 |
| WO | WO 90/02326 | 3/1990 |
| WO | WO 98/020020 | 5/1998 |
| WO | WO 99/017094 | 4/1999 |
| WO | WO 00/031774 | 6/2000 |
| WO | WO 02/031203 | 4/2002 |
| WO | WO 02/072264 | 9/2002 |
| WO | WO 03/015922 | 2/2003 |
| WO | WO 03/072796 | 9/2003 |
| WO | WO 05/040406 | 5/2005 |
| WO | WO 05/078438 | 8/2005 |
| WO | WO 05/121864 | 12/2005 |
| WO | WO 07/022026 | 2/2007 |
| WO | WO 07/035633 | 3/2007 |
| WO | WO 07/098148 | 8/2007 |
| WO | WO 08/034833 | 3/2008 |
| WO | WO 10/069913 | 6/2010 |
| WO | WO 11/049524 | 4/2011 |
| WO | WO 12/007537 | 1/2012 |
| WO | WO 13/008583 | 1/2013 |
| WO | WO 13/138767 | 3/2013 |
| WO | WO 13/181288 | 12/2013 |
| WO | WO 14/008056 | 1/2014 |
| WO | WO 14/011985 | 1/2014 |
| WO | WO 14/070783 | 5/2014 |
| WO | WO 14/070873 | 5/2014 |
| WO | WO 14/074367 | 5/2014 |
| WO | WO 15/004321 | 1/2015 |
| WO | WO 15/017889 | 2/2015 |
| WO | WO 15/061462 | 4/2015 |
| WO | WO 15/061497 | 4/2015 |
| WO | WO 15/061506 | 4/2015 |
| WO | WO 15/095623 | 6/2015 |
| WO | WO 15/164846 | 10/2015 |
| WO | WO 15/164847 | 10/2015 |
| WO | WO 15/188171 | 12/2015 |
| WO | WO 15/104321 | 2/2016 |
| WO | WO 16/019341 | 2/2016 |
| WO | WO 16/077249 | 5/2016 |
| WO | WO 16/090295 | 6/2016 |
| WO | WO 16/094308 | 6/2016 |
| WO | WO 16/094333 | 6/2016 |
| WO | WO 16/094459 | 6/2016 |
| WO | WO 16/094507 | 6/2016 |
| WO | WO 16/094522 | 6/2016 |
| WO | WO 16/094715 | 6/2016 |
| WO | WO 16/115537 | 7/2016 |
| WO | WO 16/116455 | 7/2016 |
| WO | WO 16/118915 | 7/2016 |
| WO | WO-2016118915 A1 * | 7/2016 ........ B01L 3/502715 |
| WO | WO 16/127107 | 8/2016 |
| WO | WO 16/134370 | 8/2016 |
| WO | WO 16/141343 | 9/2016 |
| WO | WO 16/172350 | 10/2016 |
| WO | WO 16/172454 | 10/2016 |
| WO | WO 16/172621 | 10/2016 |
| WO | WO 16/172623 | 10/2016 |
| WO | WO 17/059273 | 4/2017 |
| WO | WO 17/075295 | 5/2017 |
| WO | WO 17/091601 | 6/2017 |
| WO | WO 17/100347 | 6/2017 |
| WO | WO 17/117408 | 7/2017 |
| WO | WO 17/117521 | 7/2017 |
| WO | WO 17/117567 | 7/2017 |
| WO | WO 17/123978 | 7/2017 |
| WO | WO 17/161210 | 9/2017 |
| WO | WO 17/173105 | 10/2017 |
| WO | WO 17/181135 | 10/2017 |
| WO | WO 2017/176555 A1 | 10/2017 |
| WO | WO 17/205830 | 11/2017 |
| WO | WO 18/018017 | 1/2018 |
| WO | WO 18/053485 | 3/2018 |
| WO | WO 18/119043 | 3/2018 |
| WO | WO 18/064640 | 4/2018 |
| WO | WO 18/076024 | 4/2018 |
| WO | WO 18/102747 | 6/2018 |
| WO | WO 18/102748 | 6/2018 |
| WO | WO 18/102781 | 6/2018 |
| WO | WO 18/111765 | 6/2018 |
| WO | WO 18/126205 | 7/2018 |
| WO | WO 18/200872 | 11/2018 |
| WO | WO 19/015675 | 1/2019 |
| WO | WO 19/075476 | 4/2019 |
| WO | WO 19/133874 | 7/2019 |
| WO | WO 19/191459 | 10/2019 |
| WO | WO 19/232473 | 12/2019 |

OTHER PUBLICATIONS

Carl Zeiss, 2007, Objective LD "Plan-Neofluar" 40x/0.6 Corr www.micro-shop.zeiss.com Mar. 13, 2007, 2 pp.

Chen et al., Feb. 2016, High-throughput analysis and protein engineering using microcapillary arrays, Nature Chem. Biol. 12:76-81.

Chen, Jan. 2015, High-Throughput Analysis and Protein Engineering Using Microcapillary Arrays. A Dissertation Submitted to the Department of Bioengineering and the Committee on Graduate Studies of Stanford University, 190 pp.

Cherf, 2015, Applications of yeast surface display for protein engineering, Methods Mol. Biol., 13198:155-175.

Ching et al., Nov. 2, 2017, Chickens with humanized immunoglobulin genes generate antibodies with high affinity and broad epitope coverage to conserved targets, mAbs, 10(1):71-80.

(56) References Cited

OTHER PUBLICATIONS

Dobes et al., 2013, Laser-Based Directed Release of Array Elements for Efficient Collection into Targeted Microwells, Analyst, 138(3):831-838 with supplemental information.
Emmert-Buck et al., Nov. 8, 1996, Laser Capture Microdissection, Science, 274:998-1001.
Guild et al., 2011, Wheat germ cell-free expression system as a pathway to improve protein yield and solubility for the SSGCID pipeline, Acta Cryst., F67:1027-1031.
Kelkar et al., 2012, Bioluminescence based in vivo screening technologies, Curr. Opin. Pharmacol. 12:592-600.
LEICA LMD6500, LEICA LMD7000 Laser Microdissection Systems, product brochure, 2013, 16 pp.
Michelini et al., 2010, Cell-based assays: fuelling drug discovery, Anal. Bioanal. Chem. 398:227-238.
Quiagen, Cignal™ reporter assays, www.sabiosciences.com/reporterassay.php (Accessed Apr. 2017).
Quiagen, NFxB Reporter, http://www.sabiosciences.com/reporter_assay_product/HTML/CCS-013L-.html (Accessed Apr. 2017).
Salazar et al., 2007, Micropallet Arrays for the Separation of Single, Adherent Cells, Anal. Chem. 79:682-687.
Sasaki, 2006, Structural basis for Fas6-Axl signalling, the EMBO Journal, 25(1):80-87.
Vandewoestyne et al., 2013, Laser capture microdissection: Should an ultraviolet or infrared laser be used? Analytical Biochemistry, 439:88-98.
Vogel et al. 2007, Principles of Laser Microdissection and Catapulting of Histologic Specimens and Live Cells, Methods in Cell Biology, 82:153-205.
WARD's Science, 2012, Beer-Lambert Law: Measuring Percent Transmittance of Solutions at Different Concentrations, Teacher's Guide, downloaded Mar. 28, 2020 from https://www.wardsci.com/www.wardscl.com/images/Beerlamb_Colorimeter.pdf, 21 pp.

* cited by examiner

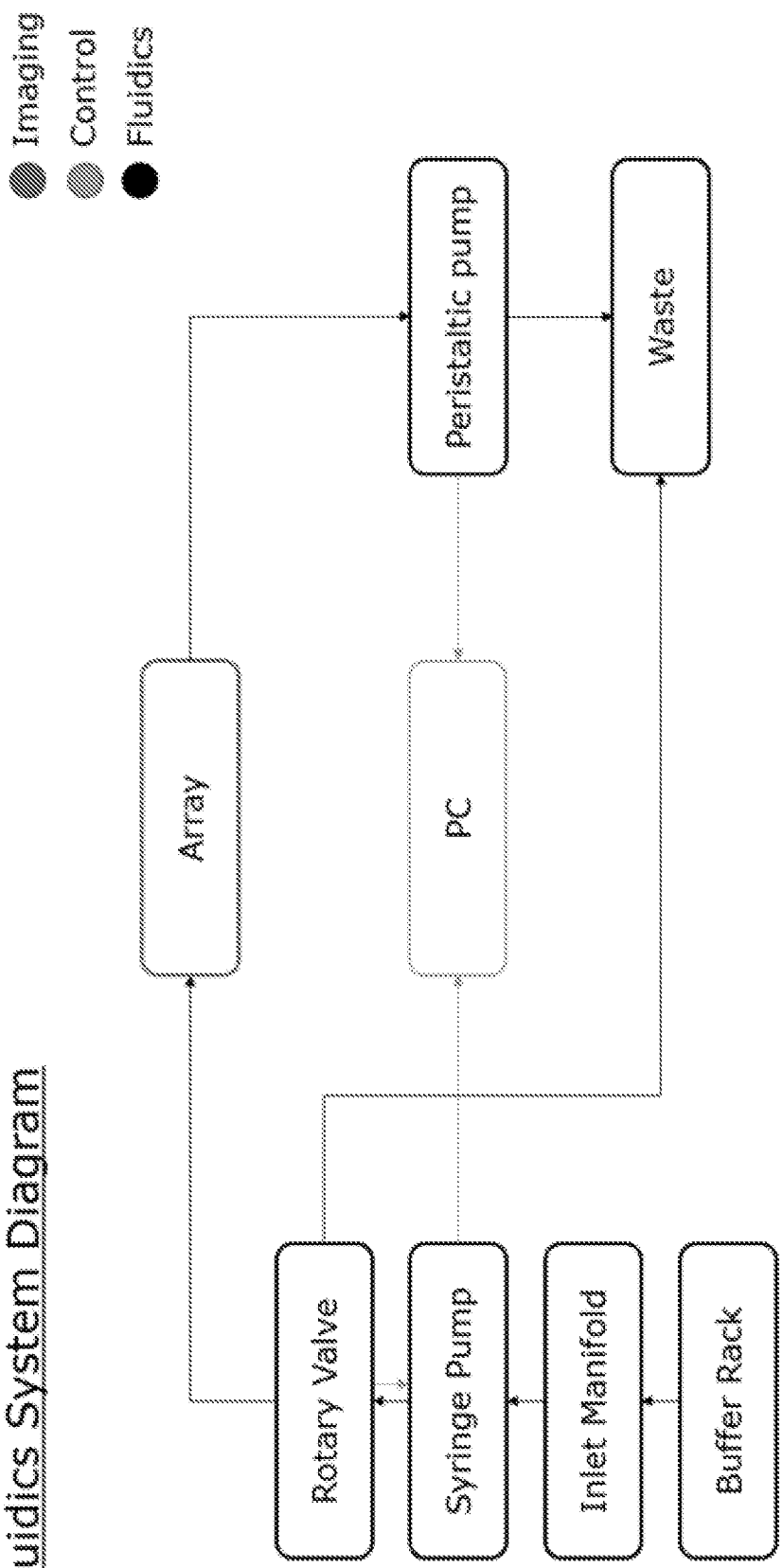

Figure 12
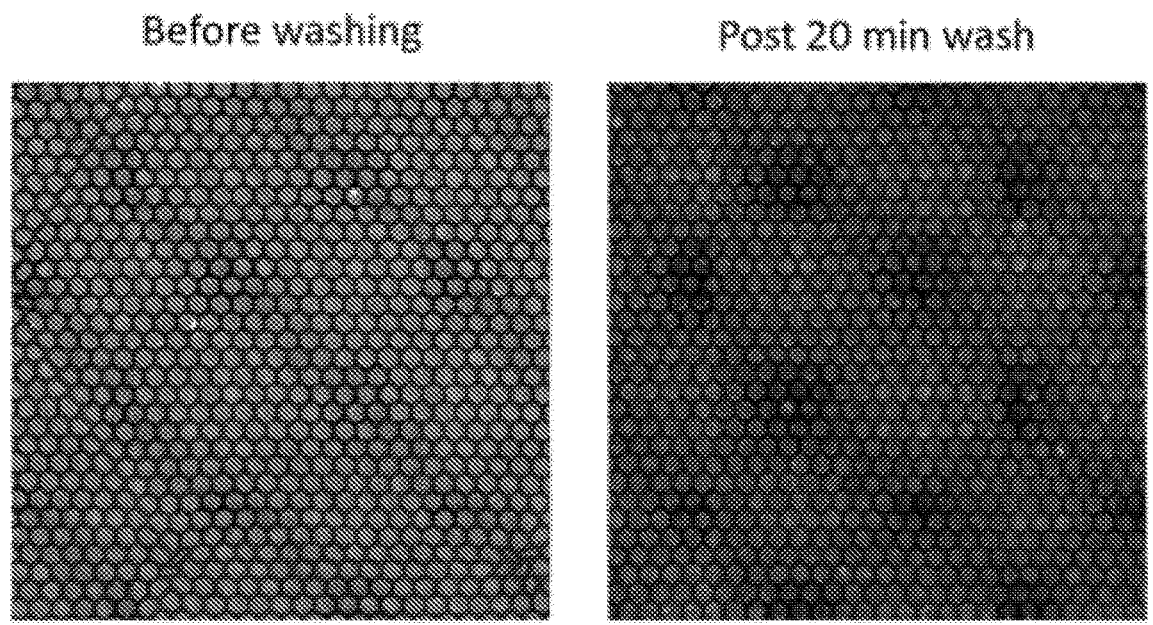
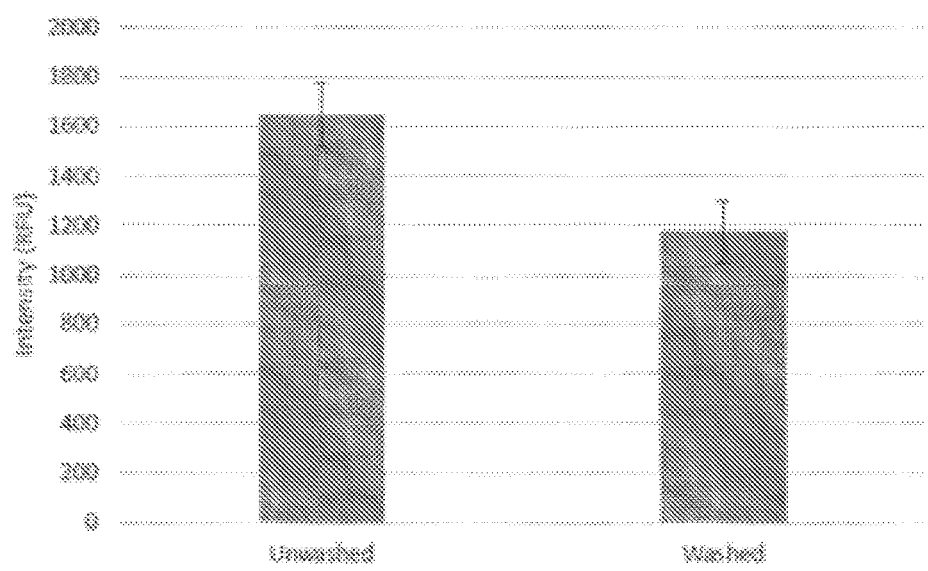

LATERAL LOADING OF MICROCAPILLARY ARRAYS

CROSS-REFERENCE TO RELATED APPLICATION

This application claims the benefit of U.S. Provisional Application No. 62/776,374, filed Dec. 6, 2018, which is incorporated herein by reference in its entirety for all purposes.

BACKGROUND OF THE INVENTION

The analysis of biological samples, including the identification, characterization, and re-engineering of proteins, nucleic acids, carbohydrates, and other important biomolecules, has benefited greatly from the scaling up of sample numbers and the scaling down of samples sizes. For example, the two-dimensional microarrays of biological materials, such as DNA microarrays, have enabled the development of high-throughput screening methods involving multiplexed approaches for processing samples and detecting results.

While such techniques provide analytical information about a particular sample, for example the presence and potentially the amount of a particular biomolecule in a solution or the sequence of a particular nucleic acid or polypeptide, they typically do not allow for the recovery of a biological sample identified by the assay without inactivating or otherwise damaging the sample of interest. Moreover, methods that allow for retrieval are often based on the use of fluorescent or other tags.

Fluorescence and other methods that have been employed in the context of microarray assay technologies have their limitations. Cells and/or molecules must fluoresce so that they are capable of detection using such fluorescence methods. As such, these methods require labeling, adding extra time and effort for assay set-up and development. In the context of high throughput technologies, such extra time and effort can be significant, in particular when working with hundreds of thousands or even millions of samples.

There is therefore a continuing need to develop improved microscale screening and analysis methods, systems and devices with high throughput capabilities, and particularly methods and systems that enable analysis and recovery of samples without the need to pre-tag or pre-label the samples being analyzed. The methods described herein meet this need and can find use in many applications, including enzyme engineering, ELISA assays, stability assays, and cell growth measurements.

While various groups have tried other methods for sample loading with regard to microcapillary arrays, the remains a need for more efficient and better methods (see, for example, U.S. Patent Publication No. 2017/0028376, U.S. Patent Publication No. 2015/0072897, U.S. Patent Publication No. 2017/0028376A9, and U.S. Pat. No. 8,105,554, all of which are incorporated by reference herein in their entireties).

With the present invention and disclosure, the inventors have developed a novel lateral loading system and method to assist with these high-throughput analyses. The present invention meets an unmet need by provide a novel method for lateral loading in a microcapillary environment.

BRIEF SUMMARY OF THE INVENTION

In an embodiment, the present invention provides a microcapillary array flow cell which provides for distributing a fluid to a fluid access region encompassing a chip comprising a plurality of microcapillary wells, wherein said microcapillary array flow cell comprises:
i) a height limiting support member comprising a fluid inlet hole, a fluid outlet hole, and an air vent hole in fluid communication with ii),
ii) an alignment member in fluid communication with i) and whose upper surface is lower than said chip comprising said plurality of microcapillary wells,
iii) a sealing gasket in fluid communication with iii), wherein said sealing gasket encompasses said plurality of microcapillary wells, and
iv) a base layer in fluid communication with iv) and which comprises a bottom planar surface,
wherein said microcapillary wells are open to at least one planar surface,
wherein said fluid is distributed in a lateral path perpendicular to said microcapillary wells,
wherein the exit pressure of the fluid from the outlet hole at said bottom planar surface is lower than the surface tension of water, lower than the capillary pressure, or lower than the liquid surface tension in the microcapillary wells, and
wherein said fluid is distributed into said microcapillary wells.

In an embodiment, the present invention provides a microcapillary array flow cell which provides for distributing a fluid to a fluid access region encompassing a chip comprising a plurality of microcapillary wells, wherein said microcapillary array flow cell comprises:
i) a cover comprising two fluid inlet holes, two fluid outlet holes, and two air vent holes in fluid communication with ii),
ii) a height limiting support member comprising two chambers, each chamber comprising a fluid inlet hole, a fluid outlet hole, and an air vent hole in fluid communication with iii),
iii) an alignment member in fluid communication with ii) and whose upper surface is lower than said chip comprising said plurality of microcapillary wells,
iv) a sealing gasket base layer combination in fluid communication with iii), wherein said sealing gasket encompasses said plurality of microcapillary wells, and said bottom of said sealing gasket is laminated to the top of a base layer which comprises a bottom planar surface, wherein the top of the sealing gasket is in fluid communication with iii) and
wherein said microcapillary wells are open to at least one planar surface,
wherein said fluid is distributed in two lateral paths perpendicular to said microcapillary wells,
wherein the exit pressure of the fluid from the outlet hole at said bottom planar surface is lower than the surface tension of water, lower than the capillary pressure, or lower than the liquid surface tension in the microcapillary wells, and
wherein said fluid is distributed into said microcapillary wells.

In an embodiment, the present invention provides a microcapillary array flow cell which provides for distributing a fluid to a fluid access region encompassing a chip comprising a plurality of microcapillary wells, wherein said microcapillary array flow cell comprises:
i) a cover comprising two fluid inlet holes, two fluid outlet holes, and two air vent holes in fluid communication with ii), ii) a height limiting support member comprising two chambers, each chamber comprising a fluid inlet hole, a fluid outlet hole, and an air vent hole in fluid communication with iii), iii) an alignment member in fluid communication with ii) and whose upper surface is lower than said chip comprising said plurality of microcapillary wells, wherein said chip is divided into two sets of microcapillary wells which align with the two chambers, iv) a sealing gasket base layer combination in fluid communication with iii), wherein said sealing gasket encompasses said plurality of microcapillary wells, and said bottom of said sealing gasket is laminated to the top of a base layer which comprises a bottom planar surface, wherein the top of the sealing gasket is in fluid communication with iii) and wherein said microcapillary wells are open to at least one planar surface, wherein said fluid is distributed in two lateral paths perpendicular to said microcapillary wells, wherein the exit pressure of the fluid from the outlet hole at said bottom planar surface is lower than the surface tension of water, lower than the capillary pressure, or lower than the liquid surface tension in the microcapillary wells, and wherein said fluid is distributed into said microcapillary wells.

In an embodiment and in accordance with the above, said fluid inlet hole, said fluid outlet hole, and said air vent hole facilitate fluid distribution into said microcapillary wells.

In an embodiment and in accordance with any of the above, said microcapillary wells are open to two planar surfaces.

In an embodiment and in accordance with any of the above, said microcapillary wells are through holes.

In an embodiment and in accordance with any of the above, said fluid is held in the microcapillary wells by surface tension.

In an embodiment and in accordance with any of the above, said height limiting support member is located about 0.05 mm to about 10 mm above said chip comprising said plurality of microcapillary wells.

In an embodiment and in accordance with any of the above, said fluid is pumped into said fluid inlet hole by an inlet pump and said fluid is pumped out of said fluid outlet hole by an outlet pump.

In an embodiment and in accordance with any of the above, a first fluid for distribution is pumped into said inlet hole, followed sequentially by pumping in a second fluid for distribution.

In an embodiment and in accordance with any of the above, after said second fluid for distribution is pumped into said inlet hole, a third fluid for distribution is pumped into said inlet hole.

In an embodiment and in accordance with any of the above, said inlet pump is a syringe pump.

In an embodiment and in accordance with any of the above, said inlet pump is a pump selected from the group consisting of TriContinent Syringe pumps, Piezoelectric Pumps, and Pressure Pumps/Pressure controllers.

In an embodiment and in accordance with any of the above, said outlet pump is a peristaltic pump.

In an embodiment and in accordance with any of the above, said outlet pump is a pump selected from the group consisting of Welco peristaltic pumps, Piezoelectric Pumps, Pressure Pumps/Pressure controllers, and Vacuum pumps In an embodiment and in accordance with any of the above, said fluid distribution occurs at a flow rate of about 1 μL/min to about 10 mL/second.

In an embodiment and in accordance with any of the above, said fluid distribution occurs at a maximum pressure of less than 5 PSI.

In an embodiment and in accordance with any of the above, said fluid distribution occurs at sufficiently low pressure to avoid fluid leakage.

In an embodiment and in accordance with any of the above, said exit pressure is less than 0.5 kPa.

In an embodiment and in accordance with any of the above, the maximum pressure within said microcapillary wells before leaking is calculated by the following formula:

$$F_{capillary} \geq F_{inlet} + F_{outlet} + F_{(gravity, sample)}.$$

In an embodiment and in accordance with any of the above, said fluid for distribution comprises a sample loading buffer.

In an embodiment and in accordance with any of the above, said fluid for distribution comprises a sample, for example for loading the sample into the microcapillary array flow cell.

In an embodiment and in accordance with any of the above, said fluid for distribution comprises a wash buffer.

In an embodiment and in accordance with any of the above, said fluid for distribution comprises a reagent.

In an embodiment and in accordance with any of the above, said fluid for distribution comprises an oil.

In an embodiment and in accordance with any of the above, said fluid for distribution comprises an oil, wherein said oil is distributed across the top of the microcapillary wells and seals the wells.

In an embodiment and in accordance with any of the above, said microcapillary array flow cell is mounted onto a microscope stage.

In an embodiment and in accordance with any of the above, said microscope stage mounting allows for imaging of said microcapillary array contents.

In an embodiment and in accordance with any of the above, said microscope stage mounting allows for recovery of said microcapillary array contents with a laser.

In an embodiment and in accordance with any of the above, the internal diameter of said microcapillary wells is from about 1 μm to about 500 μm.

In an embodiment and in accordance with any of the above, the number of microcapillary wells per cm of said chip comprising said microcapillary wells is about 460 to about 11 million or more.

In some embodiments, the present invention provides a method for loading a fluid into a microcapillary well comprising pumping said fluid for distribution into said fluid inlet hole of the microcapillary array flow cell in accordance with any of the above paragraphs.

In an embodiment and in accordance with any of the above, said method allows for uniform distribution of said fluid for distribution.

In an embodiment and in accordance with any of the above, said method allows for exchange of a first fluid for distribution with a second fluid for distribution.

In an embodiment and in accordance with any of the above, said method allows for exchange of a second fluid for distribution with a third fluid for distribution.

In some embodiments, the present invention provides a microcapillary array flow cell which provides for distributing a fluid to a fluid access region encompassing a chip comprising a plurality of microcapillary wells, wherein said microcapillary array flow cell comprises:
- i) a top layer comprising a fluid inlet hole, a fluid outlet hole, and an air vent hole in fluid communication in fluid communication with ii),
- ii) a middle layer comprising said chip comprising said plurality of microcapillary wells in fluid communication with iii),
- iii) a base layer in fluid communication with ii) and which comprises a bottom planar surface and wherein said base layer is sealed to said top layer in i),
- wherein said microcapillary wells are open to at least one planar surface,
- wherein said fluid is distributed in a lateral path perpendicular to said microcapillary wells,
- wherein the exit pressure of the fluid from the outlet hole at the bottom planar surface is lower than the surface tension of water, lower than the capillary pressure, or lower than the liquid surface tension in the microcapillary wells, and
- wherein said fluid is distributed into said microcapillary wells.

In an embodiment and in accordance with any of the above, said fluid inlet hole, said fluid outlet hole, and said air vent hole facilitate fluid distribution into said microcapillary wells.

In an embodiment and in accordance with any of the above, said microcapillary wells are open to two planar surfaces.

In an embodiment and in accordance with any of the above, said microcapillary wells are through holes.

In an embodiment and in accordance with any of the above, said fluid is held in the microcapillary wells by surface tension.

In an embodiment and in accordance with any of the above, said height limiting support member is located about 0.05 mm to about 10 mm above said chip comprising said plurality of microcapillary wells.

In an embodiment and in accordance with any of the above, said fluid is pumped into said fluid inlet hole by an inlet pump and said fluid is pumped out of said fluid outlet hole by an outlet pump.

In an embodiment and in accordance with any of the above, a first fluid for distribution is pumped into said inlet hole, followed sequentially by pumping in a second fluid for distribution.

In an embodiment and in accordance with any of the above, after said second fluid for distribution is pumped into said inlet hole, a third fluid for distribution is pumped into said inlet hole.

In an embodiment and in accordance with any of the above, said inlet pump is a syringe pump.

In an embodiment and in accordance with any of the above, said inlet pump is a pump selected from the group consisting of TriContinent Syringe pumps, Piezoelectric Pumps, and Pressure Pumps/Pressure controllers.

In an embodiment and in accordance with any of the above, said outlet pump is a peristaltic pump.

In an embodiment and in accordance with any of the above, said outlet pump is a pump selected from the group consisting of Welco peristaltic pumps, Piezoelectric Pumps, Pressure Pumps/Pressure controllers, and Vacuum pumps In an embodiment and in accordance with any of the above, said fluid distribution occurs at a flow rate of about 1 µL/min to about 10 mL/second.

In an embodiment and in accordance with any of the above, said fluid distribution occurs at a maximum pressure of less than 5 PSI.

In an embodiment and in accordance with any of the above, said fluid distribution occurs at sufficiently low pressure to avoid fluid leakage.

In an embodiment and in accordance with any of the above, said exit pressure is less than 0.5 kPa.

In an embodiment and in accordance with any of the above, the maximum pressure within said microcapillary wells before leaking is calculated by the following formula:

$$F_{capillary} \geq F_{inlet} + F_{outlet} + F_{(gravity, sample)}.$$

In an embodiment and in accordance with any of the above, said fluid for distribution comprises a sample loading buffer.

In an embodiment and in accordance with any of the above, said fluid for distribution comprises a sample, for example for loading the sample into the microcapillary array flow cell.

In an embodiment and in accordance with any of the above, said fluid for distribution comprises a wash buffer.

In an embodiment and in accordance with any of the above, said fluid for distribution comprises a reagent.

In an embodiment and in accordance with any of the above, said fluid for distribution comprises an oil.

In an embodiment and in accordance with any of the above, said fluid for distribution comprises an oil, wherein said oil is distributed across the top of the microcapillary wells and seals the wells.

In an embodiment and in accordance with any of the above, said microcapillary array flow cell is mounted onto a microscope stage.

In an embodiment and in accordance with any of the above, said microscope stage mounting allows for imaging of said microcapillary array contents.

In an embodiment and in accordance with any of the above, said microscope stage mounting allows for recovery of said microcapillary array contents with a laser.

In an embodiment and in accordance with any of the above, the internal diameter of said microcapillary wells is from about 1 µm to about 500 µm.

In an embodiment and in accordance with any of the above, the number of microcapillary wells per cm of said chip comprising said microcapillary wells is about 460 to about 11 million or more.

In an embodiment and in accordance with any of the above, the present invention provides a method for loading a fluid into a microcapillary well comprising pumping said fluid for distribution into said fluid inlet hole of the microcapillary array flow cell in accordance with any of the above.

In an embodiment and in accordance with any of the above, said method allows for uniform distribution of said fluid for distribution.

In an embodiment and in accordance with any of the above, said method allows for exchange of a first fluid for distribution with a second fluid for distribution.

In an embodiment and in accordance with any of the above, said method allows for exchange of a second fluid for distribution with a third fluid for distribution.

In an embodiment and in accordance with any of the above, said wash buffer comprises 1× phosphate buffered saline.

In an embodiment and in accordance with any of the above, said wash buffer comprises 4-(2-hydroxyethyl)-1-piperazineethanesulfonic acid (HEPES).

In an embodiment and in accordance with any of the above, said wash buffer comprises a live cell imaging solution.

In an embodiment and in accordance with any of the above, said fluid for distribution and/or wash buffer comprise a growth media.

In an embodiment and in accordance with any of the above, said growth media is comprises a growth media selected from the group consisting of DMEM, RPMI, and IMEM.

In an embodiment and in accordance with any of the above, said reagent is a lysis buffer.

In an embodiment and in accordance with any of the above, said lysis buffer comprises 1% v/v NP-40, 20 mM Tris-HCL, 5 mM Sodium Pyrophosphate, and 5 mM EDTA.

In an embodiment and in accordance with any of the above, said lysis buffer comprises 1% Triton, 20 mM Tris-HCl, 150 mM NaCl, 5 mM Sodium Pyrophosphate, and 5 mM EDTA.

In an embodiment and in accordance with any of the above, said Triton or NP-40 can be between 0.005% and 10%.

In an embodiment and in accordance with any of the above, said reagent is an antibody.

In an embodiment and in accordance with any of the above, said antibody is fluorescently labeled.

In an embodiment and in accordance with any of the above, said antibody is a primary antibody.

In an embodiment and in accordance with any of the above, said primary antibody is selected from the group consisting of: an anti-CD25 antibody, an anti-CD69 antibody, and an anti-CD107a antibody.

In an embodiment and in accordance with any of the above, said antibody is a secondary antibody.

In an embodiment and in accordance with any of the above, said secondary antibody is against a target selected from the group consisting of: mouse, human, rabbit, rat, goat, chicken, sheep, guinea pig, hamster, bovine, donkey, dog, camelid, cat, pig, non-human primate, and horse.

In another embodiment, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, such that fluid does not leak out of the microcapillary array flow cell.

In another embodiment, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein said fluid distribution occurs at a maximum pressure of less than 5 PSI, such that fluid does not leak out of the microcapillary array flow cell.

In another embodiment, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein said exit pressure is less than 0.5 kPa, such that fluid does not leak out of the microcapillary array flow cell.

In another embodiment, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein the maximum pressure within said microcapillary wells before leaking is calculated by the following formula:

$$F_{capillary} \geq F_{inlet} + F_{outlet} + F_{(gravity, sample)}.$$

such that fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said fluid distribution occurs at a maximum pressure of less than 5 PSI, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said fluid distribution occurs at sufficiently low pressure to avoid fluid leakage, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said exit pressure is less than 0.5 kPa, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein the maximum pressure within said microcapillary wells before leaking is calculated by the following formula:

$$F_{capillary} \geq F_{inlet} + F_{outlet} + F_{(gravity, sample)},$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 μL/min to about 10 mL/second, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 μL/min to about 10 mL/second, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 μL/min to about 10 mL/second, wherein said fluid distribution occurs at a maximum pressure of less than 5 PSI, wherein said fluid distribution occurs at sufficiently low pressure to avoid fluid leakage, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 μL/min to about 10 mL/second, wherein said exit pressure is less than 0.5 kPa, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 μL/min to about 10 mL/second, wherein the maximum pressure within said microcapillary wells before leaking is calculated by the following formula:

$$F_{capillary} \geq F_{inlet} + F_{outlet} + F_{(gravity, sample)},$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said exit pressure is less than 0.5 kPa, wherein the fluid is distributed into the microcapillary wells, and wherein the fluid does not leak out of the microcapillary array flow cell. In some embodiments, the exit pressure is the fluidic resistance out of the lateral flow cell outlet.

In another embodiment, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)}.$$

$F_{inlet}$ is in the inlet pump pressure. With the $2^{nd}$ pump, $F_{outlet}$ should be ~0.

$$F_{gravity} = \rho g (\pi r^2) * h$$

wherein ρ is density, r=capillary diameter, and h=thickness of chip $$F_{capillary} = 2(\pi r) * \gamma * \cos(\theta)$$

For pure water and clean glass, θ=0, so the formula becomes $$F_{capillary} = 2(\pi r) * \gamma,$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)},$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein said fluid distribution occurs at sufficiently low pressure to avoid fluid leakage, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein said exit pressure is less than 0.5 kPa, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein said exit pressure is less than 0.5 kPa, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity,sample)},$$

wherein said exit pressure is less than 0.5 kPa, wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein the maximum pressure within said microcapillary wells before leaking is calculated by the following formula:

$$F_{capillary} \geq F_{inlet} + F_{outlet} + F_{(gravity,sample)},$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein the maximum pressure within said microcapillary wells before leaking is calculated by the following formula:

$$F_{capillary} \geq F_{inlet} + F_{outlet} + F_{(gravity,sample)},$$

wherein the fluid is distributed into the microcapillary wells, and wherein the fluid does not leak out of the microcapillary array flow cell.

In another embodiment, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity,sample)},$$

In another embodiment, the invention provides a method for distribution of a fluid in a microcapillary array flow cell according to any one of the preceding paragraphs, using the microcapillary array flow cell of any one of one of the preceding paragraphs.

BRIEF DESCRIPTION OF THE DRAWINGS

FIG. 7: Provides a fluidics system diagram.

FIG. 12: Provides data showing an array before washing and after washing using the flow cell. 20 minutes with wash with buffer reduced background fluorescence by 30%.

DETAILED DESCRIPTION OF THE INVENTION

I. Introduction

Figure 1:
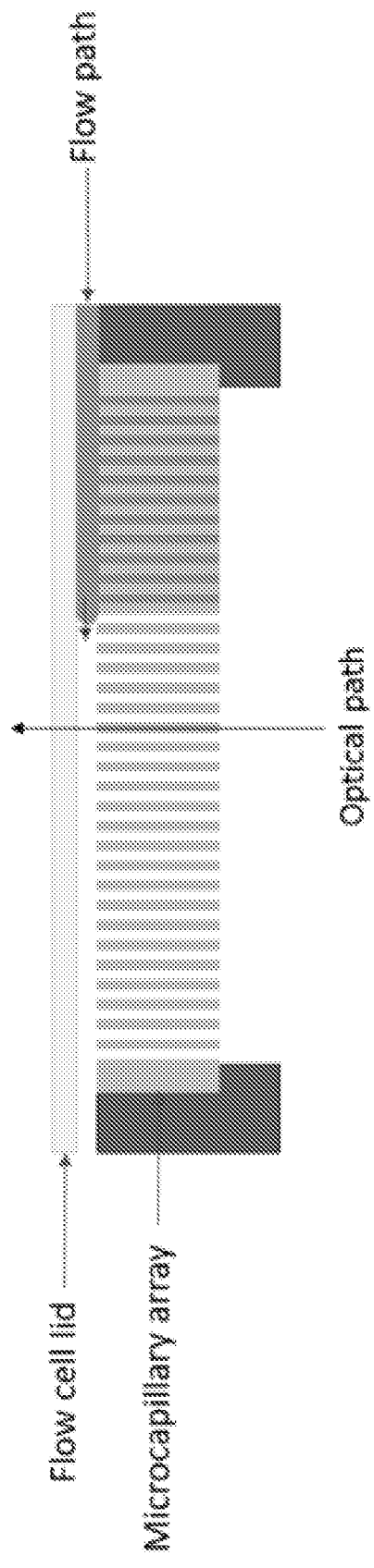
FIG. 1: Provides a schematic of the flow cell concept.
Figure 2:
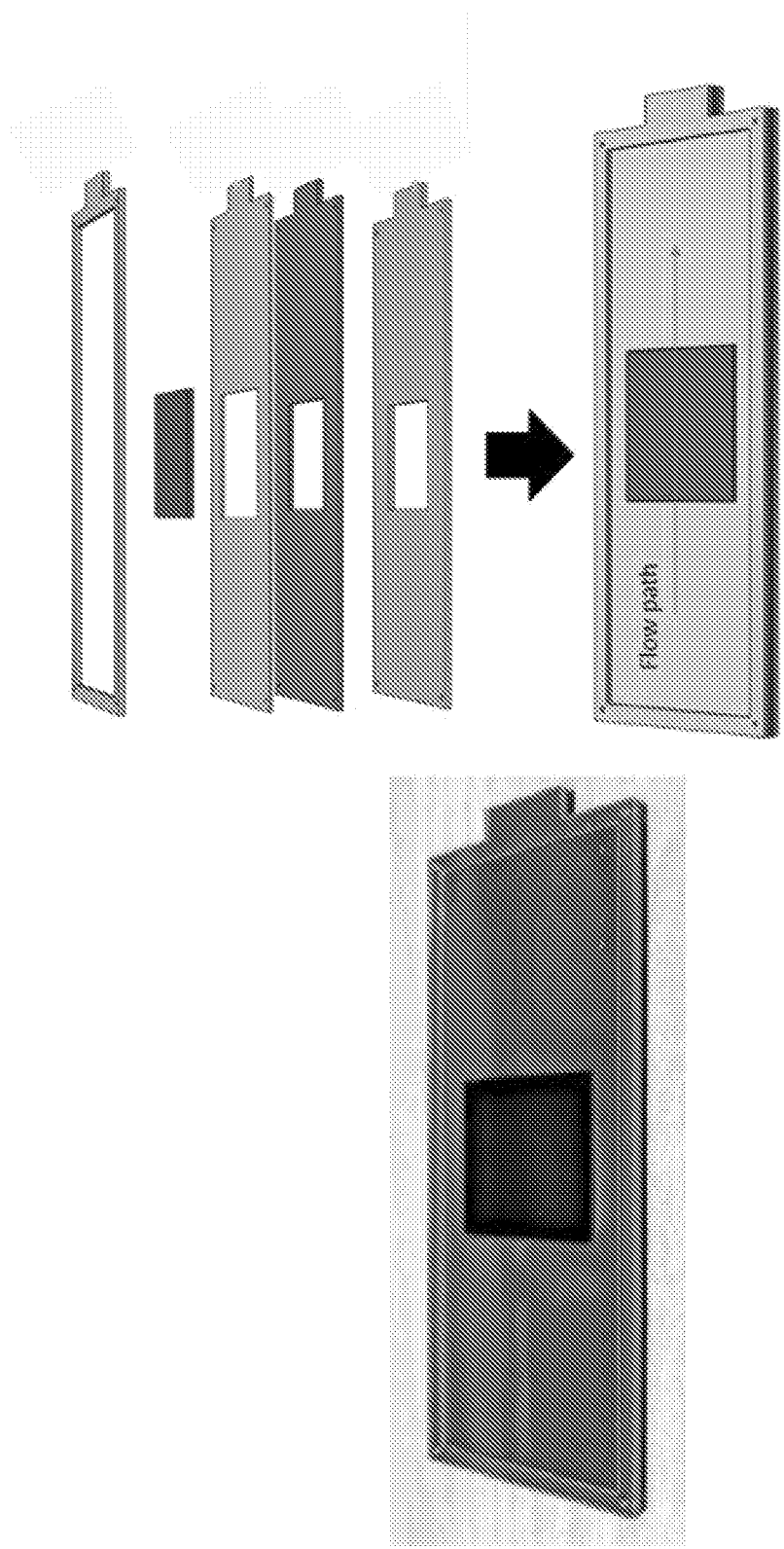
FIG. 2: Provides a schematic of the flow cell structure, in particular the flow cell bottom.
Figure 3:
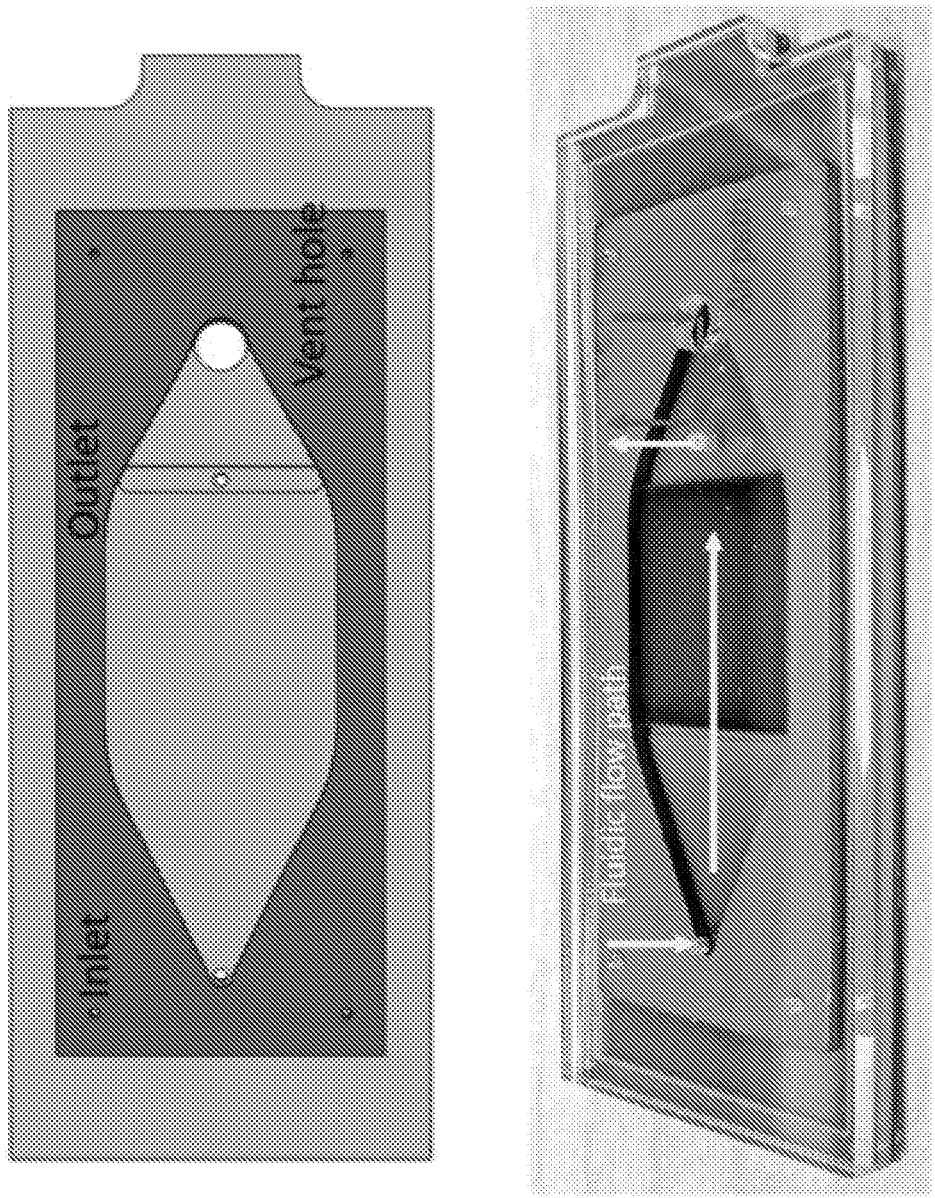
FIG. 3: Provides a schematic of the flow cell top and the fluidic flow path through the flow cell.

Microcapillary arrays have recently been employed in approaches for high-throughput analysis and protein engineering with large numbers of biological samples, for example in an approach that has been termed "microcapillary single-cell analysis and laser extraction" or "μSCALE". See Chen et al. (2016) *Nature Chem. Biol.* 12:76-8. This approach relies on the spatial segregation of single cells within a microcapillary array, and thus enables repeated imaging, cell growth, and protein expression of the separate samples within each microcapillary of the microcapillary array. Accordingly, the technique enables massively parallel, quantitative biochemical and biophysical measurements on millions or multi-millions of samples within a microcapillary array, for example, in the analysis of millions or multi-millions of protein variants expressed from yeast, bacteria, or other suitable cells distributed throughout the array. Advantageously, the approach has allowed the simultaneous time-resolved kinetic analysis of the multiplexed samples, as well as the sorting of those cells based on targeted phenotypic features.

The development of μSCALE methods and apparatus for the quantitative biochemical and biophysical analysis of populations of biological variants has also been reported in U.S. Patent Application Publication No. 2016/0244749 A1, which is incorporated by reference herein in its entirety. Extraction of the contents of a desired microcapillary according to the μSCALE approach requires, however, the inclusion of a radiation-absorbing material in each sample and the directing of electromagnetic radiation from a pulsed laser into this material, thus adding complexity to the extraction methods. In addition, earlier methods of screening of biological variants in arrays of microcavities relied on the addition of microparticles to the arrayed samples to partially or completely inhibit the transmission of electromagnetic radiation into and out of the sample in order to minimize signal emitted from microcavities lacking a desired binding activity. See U.S. Patent Application Publication No. U.S. 2014/0011690 A1. In some aspects of the invention, the screening methods do not rely on these additional sample components or manipulations, thus simplifying and improving the efficiency of the screening techniques.

As stated above, the present invention and disclosure, provides a novel lateral loading system and method to assist with these high-throughput analyses. The present invention meets an unmet need by provide a novel method for lateral loading in a microcapillary environment.

II. Definitions

Terms used in the claims and specification are defined as set forth below unless otherwise specified. In the case of direct conflict with a term used in a parent provisional patent application, the term used in the instant specification shall control. "Amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, and O-phosphoserine. Amino acid analogs refer to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refer to chemical compounds that have a structure that is different from the general chemical structure of an amino acid, but that function in a manner similar to a naturally occurring amino acid. Amino acids can be referred to herein by either their commonly known three letter symbols or by the one-letter symbols recommended by the IUPAC-IUB Biochemical Nomenclature Commission. Nucleotides, likewise, can be referred to by their commonly accepted single-letter codes.

An "amino acid substitution" refers to the replacement of at least one existing amino acid residue in a predetermined amino acid sequence (an amino acid sequence of a starting polypeptide) with a second, different "replacement" amino acid residue. An "amino acid insertion" refers to the incorporation of at least one additional amino acid into a predetermined amino acid sequence. While the insertion will usually consist of the insertion of one or two amino acid residues, the present larger "peptide insertions," can be made, e.g. insertion of about three to about five or even up to about ten, fifteen, or twenty amino acid residues. The inserted residue(s) may be naturally occurring or non-naturally occurring as disclosed above. An "amino acid deletion" refers to the removal of at least one amino acid residue from a predetermined amino acid sequence.

"Polypeptide," "peptide", and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

The term "protein", as used herein, refers both to full-length proteins or polypeptide sequences and to fragments thereof. Such fragments may include fragments that retain a functional activity, such as, for example, a binding activity. The terms "protein" and "polypeptide" are used interchangeably throughout the disclosure and include chains of amino acids covalently linked through peptide bonds, where each amino acid in the polypeptide may be referred to as an "amino acid residue". Use of the terms "protein" or "polypeptide" should not be considered limited to any particular length of polypeptide, e.g., any particular number of amino acid residues. The subject proteins may include proteins having non-peptidic modifications, such as post-translational modifications, including glycosylation, acetylation, phosphorylation, sulfation, or the like, or other chemical modifications, such as alkylation, acetylation, esterification, PEGylation, or the like. Additional modifications, such as the inclusion of non-natural amino acids within a polypeptide sequence or non-peptide bonds between amino acid residues should also be considered within the scope of the definition of the term "protein" or "polypeptide".

In some embodiments, the population of variant proteins is a population of proteins having minor variations, for example a population of proteins where each protein has a slightly different amino acid sequence or a different post-translational modification. In some embodiments, the variant proteins can differ by 1, 2, 3, 4, 5, 6, 7, 8, 9, or 10 or more amino acids. In some embodiments, the variants differ by at least 1 amino acid. The screening assays can, therefore, identify variant protein sequences having desirable properties. Because the screens can be performed in such large numbers at microscopic scale, huge numbers of variant proteins can be assayed in relatively short times.

"Nucleic acid" refers to deoxyribonucleotides or ribonucleotides and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions) and complementary sequences and as well as the sequence explicitly indicated. Specifically, degenerate codon substitutions can be achieved by generating sequences in which the third position of one or more selected (or all) codons is substituted with mixed-base and/or deoxyinosine residues (Batzer et al., *Nucleic Acid Res.* 19:5081, 1991; Ohtsuka et al., *Biol. Chem.* 260: 2605-2608, 1985; and Cassol et al., 1992; Rossolini et al., *Mol. Cell. Probes* 8:91-98, 1994). For arginine and leucine, modifications at the second base can also be conservative. The term nucleic acid is used interchangeably with gene, cDNA, and mRNA encoded by a gene. Polynucleotides used herein can be composed of any polyribonucleotide or polydeoxribonucleotide, which can be unmodified RNA or DNA or modified RNA or DNA. For example, polynucleotides can be composed of single- and double-stranded DNA, DNA that is a mixture of single- and double-stranded regions, single- and double-stranded RNA, and RNA that is mixture of single- and double-stranded regions, hybrid molecules comprising DNA and RNA that can be single-stranded or, more typically, double-stranded or a mixture of single- and double-stranded regions. In addition, the polynucleotide can be composed of triple-stranded regions comprising RNA or DNA or both RNA and DNA. A polynucleotide can also contain one or more modified bases or DNA or RNA backbones modified for stability or for other reasons. "Modified" bases include, for example, tritylated bases and unusual bases such as inosine. A variety of modifications can be made to DNA and RNA; thus, "polynucleotide" embraces chemically, enzymatically, or metabolically modified forms.

"Microcavity" and variations thereof refer to a microcavity array comprising a plurality of microcavities, each microcavity comprising a sample component, including but not limited to proteins, polypeptides, nucleic acids, small molecules, and/or cells. The term microcavity includes microcapillaries and/or microwells.

III. High-Throughput Imaging Systems

In some embodiments, the present disclosure provides an imaging system for detecting transmittance in order to calculate the absorbance. Such imaging systems comprise a variety of components, including (A) a light source unit for providing one or more illumination and/or excitation lights to a target, the light source unit comprising at least one light source, (B) a detection unit comprising at least one detector capable of detecting transmitted light and/or fluorescence from the a sample (i.e., target) contained in a microcavity, (C) an optical train for directing the one or more illumination and/or excitation lights from the light source unit to the sample and for directing the transmitted light and/or fluorescence from the target to the detection unit; and (D) a control unit for controlling the light source unit and the detection unit. As one of skill in the art would appreciate, the components described herein are operatively connected to one another. See, for example, U.S. Patent Application No. 2018-0164294, incorporated herein by reference for all purposes.

Any suitable microscope or imaging system capable of emitting light and detecting transmitted light for a large number of samples can be employed with the present high-throughput methods. For example, the microscope systems described in, for example, U.S. Application No. 62/433,210, can be employed with the present methods.

Such microscope or imaging systems suitable for use with the methods of the present invention include a light source with a selectable wavelength and a detector for detecting the amount of light transmitted through a given sample.

In some embodiments, the imaging systems consist of four major components, a light source, a lens, detector, and computer or other system controller. In some embodiments, other than the computer or other system controller, these components have been optimized for high-throughput applications.

In some embodiments, the imaging system comprises a light source with a selectable wavelength. In some embodiments, the light source is a plasma light source. In some embodiments, the light source is a high power plasma light source. In some embodiments, the light source is coupled to a monochromator. In some embodiments, the light source is a diode laser with a defined wavelength. In some embodiments, the laser is a UV laser. In some embodiments, the UV laser is a 375 nm laser. In some embodiments, the laser is a visible spectrum laser. In some embodiments, the visible spectrum laser is selected from the group consisting of 404 nm, 405 nm, 406 nm, 450 nm, 462 nm, 473 nm, 488 nm, 520 nm, 532 nm, 633 nm, 635 nm, 637 nm, 638 nm, 639 nm, 640 nm, 642 nm, 650 nm, 658 nm, 660 nm, 670 nm, 685 nm, and 690 nm. In some embodiments, the laser is a commercially available laser. In some embodiments, the commercial laser includes, for example, those available from Thorlabs (see, for example, those listed on the World Wide Web at Thorlabs.com/newgrouppage9.cfm?objectgroup_id=7). In some embodiments, LEDs (light emitting diodes) are used for the light source. LEDs can provide fast on and off times, well defined emission spectra and exceptional short and long-term stability. In some embodiments, the first light engine in the plurality of light engines emits a white light. In some embodiments, the LED chips emit white light. In some embodiments, the first light engine in the plurality of light engines comprises LEDs. Such LED chips for use in the imaging systems of the present invention are readily available from commercial sources in a variety of wavelengths/colors.

In some embodiments, the imaging system consists of one or more high-resolution cameras. In some embodiments the camera is a black and white camera. In some embodiments, the camera is a color camera. In some embodiments, the imaging system consists of one real-time, high-resolution camera, one color camera. In some embodiments, the imaging system consists of one color camera and one monochrome camera, in order to expand the range of detection.

In some embodiments, while the two cameras see exactly the same field of view, they capture different information. The color camera captures RGB light while the monochrome (black and white) camera captures transmitted light in the same field. In some embodiments, to capture two different images one can employ a high-speed pulsed light source that is synchronized with the image capturing process. In some embodiments, to capture two different images one can employ a high-speed pulsed light source in combination with two cameras.

Photodiodes are traditionally used in absorbance measurements. In some embodiments, the transmitted light is detected using a photodiode. Photodiodes typically have a higher dynamic range but need be coupled with imaging of the location of each well. In some embodiments, the detector is a photodiode and the location of each well is determined. In some embodiments, a camera takes an image of the entire microcavity field.

In some embodiments, the images are used to find the location of the microcavities. In some embodiments, the image of the microcavity field is then compared to the transmittance image in order to determine the transmittance for each microcavity. In some embodiments, the transmittance values are mapped to locations on the image generated of the entire microcapillary field. In some embodiments, the absorbance values are then determined for each location in the microcavity field via the photodiode. In some embodiments, the absorbance value is determined for one location in the microcavity field via the photodiode.

An optical train, also referred to as an optical assembly, is an arrangement of lenses employed as part of an imaging system and which functions to guide a light source, including a laser. The position and angle of lenses may be adjusted to guide a laser through the path required and such adjustments would be within the level of skill of one of skill in the art to adjust as needed for an imaging system. In some embodiments, the imaging system includes an optical train for directing the one or more illumination and/or excitation lights from the light source unit to the sample and for directing the transmitted light and/or fluorescence from the sample to the detection unit.

In some embodiments, the optical train for the instrument is based on a modified microscope. In some embodiments, the microscope provides front-end image collection and optical zoom with high light collection efficiency. In some embodiments, the imaging system includes a color camera. In some embodiments, the imaging system includes a black and white camera. In some embodiments, the imaging system includes a color camera and a black and white camera. In some embodiments, the optical train is coupled to one or more emission filters optimized for a particular wavelength, fluorophore, and/or ratiometric dye.

In some embodiments, the imaging system comprises 1, 2, 3, 4, 5, or 6 filters. In some embodiments, the imaging system comprises 1 filter. In some embodiments, the imaging system comprises 2 filters. In some embodiments, the imaging system comprises 3 filters. In some embodiments, the imaging system comprises 4 filters. In some embodiments, the imaging system comprises 5 filters. In some embodiments, the imaging system comprises 6 filters. In some embodiments, the one or more filters are operably coupled to the imaging system. In some embodiments, the filters are included in a filter wheel. In some embodiments, the filter wheel is operably coupled to the imaging system. In some embodiments, one filter is employed at a time, but the system is capable of switching between 1, 2, 3, 4, 5, or 6 filters in order to measure the absorbances of the samples at different wavelengths. In some embodiments, multiple filters could be used in series to narrow and/or define the range of light that reaches the sample and/or detector. In some embodiments, the one or more filters are between the light source and the sample. In some embodiments, the one or more filters are between the sample and the detector. In some embodiments, the one or more filters are in series between the sample and the detector.

In some embodiments, a uniform distribution of excitation light across the specimen plane is achieved for proper sample illumination and transmittance measurements. In some embodiments, high uniformity is achieved by using a liquid light guide. In some embodiments, a liquid light guide is employed. In some embodiments, the light passes through the liquid light guide prior to passing through the sample. In some embodiments, optics that collimate light are employed (i.e., make the rays of light accurately parallel). In some embodiments, a light guide and optics that collimate light are employed. In some embodiments, uniformity of greater than 80%, 85%, 90%, 95% or 99% can be achieved at the specimen plane. In some embodiments, uniformity of greater than 95% can be achieved at the specimen plane.

In some embodiments, one or more detectors are employed to detect a variety of different light from a variety of light sources as described herein. In some embodiments, a detection unit comprises at least a first detector that detects the transmittance of the light through the sample. In some embodiments, the detection unit comprises at least one detector that detects a fluorescence emitted from a sample. In some embodiments, the detection unit comprises at least one detector that detects other light emitted from a sample, such light from chemiluminescence (also referred to as "chemoluminescence"). In some embodiments, a detector comprises two or more detectors. In some embodiments, the two or more detectors are of differing types. In some embodiments, the two or more detectors are selected from detectors capable of detecting light transmitted through a sample, fluorescent light emitted from a sample, and/or other light emitted from a sample. In some embodiments, such light is from chemiluminescence (also referred to as "chemoluminescence"), as well as combinations thereof.

In some embodiments, the detector comprises a color camera. In some embodiments, the detector comprises a monochrome camera. In some embodiments, the detector comprises a photodiode. In some embodiments, there are two or more detectors. In some embodiments, the two or more detectors comprise a color camera, a monochrome camera, and/or a photodiode, as well as combinations thereof.

In some embodiments, the camera employs a charge-coupled device (CCD), a Complementary metal-oxide-semiconductor (CMOS), or a Scientific CMOS (sCMOS) sensor. In some embodiments, the camera employs a charge-coupled device (CCD). In some embodiments, the camera employs a Complementary metal-oxide-semiconductor (CMOS). In some embodiments, the camera employs a Scientific CMOS (sCMOS) sensor.

In some embodiments, the allowable display modes vary depending upon the type of light detected. For example, in some embodiments the images can be displayed in one of three modes: 1) full color image only (color camera), 2) fluorescent image (monochrome camera), and/or 3) full color image overlaid with fluorescent image (color camera and monochrome camera). In some embodiments, the image is displayed as a full color image only (color camera). In some embodiments, the image is displayed as a fluorescent image (monochrome camera). In some embodiments, the image is displayed as a full color image overlaid with fluorescent image (color camera and monochrome camera).

In some embodiments, the imaging system further comprises a display unit for displaying an image and/or displaying a plurality of images. A display unit can include but is not limited to a monitor, television, computer screen/terminal, LCD display, LED display or any other display unit on which an image can be viewed and with can be connected to the imaging system described herein. In some embodiments, the display unit displays the plurality of images by displaying the transmitted light image in real-time. In some embodiments, different images from different light sources can be overlaid in order to obtain additional information about a sample. In some embodiments, transmitted light, fluorescence light, and/or other light images can be combined and overlaid, depending upon the sample identity.

In some embodiments, the light source unit is controlled by the control unit such that only one light source is energized at a time.

In some embodiments, the light source unit is controlled by the control unit such that each light source is energized sequentially.

In some embodiments, the control unit synchronizes the light source unit and the detection unit. In some embodiments, the control unit synchronizes the light source unit and the detection unit such that each light source is energized sequentially.

In some embodiments, the control unit and the display unit are embedded in a computer. In some embodiments, the control unit and the display unit are part of a computer system or other controller system.

In some embodiments, the control unit is capable of performing the imaging algorithms described herein. In some embodiments, the computer is pre-programmed to run the imaging algorithms. In some embodiments, the control unit is capable of controlling the light source unit and the detection unit. In some embodiments, optionally the control unit is capable of a) comparing the light transmittance intensity obtained for each individual sample in step ii to the light transmittance intensity for a control sample; and b) calculating the absorbance of each individual sample in the array based on the comparison in order to determine differences between said samples.

One of skill in the microscopic arts would understand how to connect the various components and equipment described herein in order to employ the methods of the present invention.

IV. Microcavity Array

In these methods, the microcavity arrays comprise any array which comprises individual chambers and which allows for the transmission of light through the array and onto a detector. In some embodiments, the arrays are microcapillary arrays. In some embodiments the microcapillary arrays comprise a plurality of longitudinally fused capillaries, for example fused silica capillaries, although any other suitable material may be utilized in the arrays. See, e.g., the arrays described U.S. Application No. 62/433,210, filed Dec. 12, 2016, U.S. application Ser. No. 15/376,588, filed on Dec. 12, 2016, PCT International Patent Publication Nos. WO 2012/007537 and WO 2014/008056, the disclosures all of which are incorporated by reference herein in their entireties.

Such arrays can be fabricated, for example, by bundling millions or billions of silica capillaries and fusing them together through a thermal process, although other suitable methods of fabrication may also be employed. The fusing process may comprise, for example, the steps of i) heating a capillary single draw glass that is drawn under tension into a single clad fiber; ii) creating a capillary multi draw single capillary from the single draw glass by bundling, heating, and drawing; iii) creating a multi-draw multi-capillary from the multi-draw single capillary by additional bundling, heating, and drawing; iv) creating a block assembly of drawn glass from the multi-multi-draw multi-capillary by stacking in a pressing block; v) creating a block pressing block from the block assembly by treating with heat and pressure; and vi) creating a block forming block by cutting the block pressing block at a precise length (e.g., 1 mm).

In some embodiments, the fabrication method further comprises slicing the silica capillaries, thereby forming very high-density glass microcapillary arrays. In some embodiments, the microcapillary arrays may be cut to approximately 1 millimeter in height, but even shorter microcapillary arrays are contemplated, including arrays of 10 µm in height or even shorter. In some embodiments, even longer microcapillary arrays are contemplated, including arrays of 10 mm or even longer.

Such processes form very high-density microcapillary arrays that are suitable for use in the present methods. In an exemplary array, each microcapillary has an approximate 5 µm diameter and approximately 66% open space (i.e., representing the lumen of each microcapillary). In some arrays, the proportion of the array that is open ranges from between about 50% and about 90%, for example about 60% to about 75%, such as a microcapillary array provided by Hamamatsu that has an open area of about 67%. In one particular example, a 10×10 cm array having 5 µm diameter microcapillaries and approximately 66% open space has about 330 million total microcapillaries.

In various embodiments, the internal diameter of each microcapillary in the array ranges from between approximately 1 µm and 500 µm. In some arrays, each microcapillary can have an internal diameter in the range between approximately 1 µm and 300 µm; optionally between approximately 1 µm and 100 µm; further optionally between approximately 1 µm and 75 µm; still further optionally between approximately 1 µm and 50 µm; and still further optionally between approximately 5 µm and 50 µm.

In some microcapillary arrays, the open area of the array comprises up to 90% of the open area (OA), so that, when the pore diameter varies between 1 µm and 500 µm, the number of microcapillaries per cm of the array varies between approximately 460 and over 11 million. In some microcapillary arrays, the open area of the array comprises about 67% of the open area, so that, when the pore size varies between 1 µm and 500 µm, the number of microcapillaries per square cm of the array varies between approximately 340 and over 800,000. In some embodiments, the number of microcapillaries per square cm of the array is approximately 400; 800; 1000; 2000; 4000; 5000; 10,0000; 25,000; 50,000; 75,000; 100,000; 200,000; 300,000; 400,000; 500,000; 600,000; 700,000; 800,000; 900,000; 1,000,000 or more.

In one particular embodiment, a microcapillary array can be manufactured by bonding billions of silica capillaries and then fusing them together through a thermal process. After that slices (0.5 mm or more) are cut out to form a very high aspect ratio glass microcapillary array. Arrays are also commercially available, such as from Hamamatsu Photonics K. K. (Japan), Incom, Inc. (Massachusetts), Photonis Technologies, S.A.S. (France) Inc., and others. In some embodiments, the microcapillaries of the array are closed at one end with a solid substrate attached to the array.

The microcapillary arrays of the instant screening methods can comprise any number of microcapillaries within the array. In some embodiments, the microcapillary array comprises at least 100,000, at least 300,000, at least 1,000,000, at least 3,000,000, at least 10,000,000, or even more microcapillaries. In some embodiments, the microcapillary array comprises at least 100,000. In some embodiments, the microcapillary array comprises at least 200,000 microcapillaries. In some embodiments, the microcapillary array comprises at least 300,000 microcapillaries. In some embodiments, the microcapillary array comprises at least 400,000 microcapillaries. In some embodiments, the microcapillary array comprises at least 500,000 microcapillaries. In some embodiments, the microcapillary array comprises at least 600,000 microcapillaries. In some embodiments, the microcapillary array comprises at least 700,000 microcapillaries. In some embodiments, the microcapillary array comprises at least 800,000 microcapillaries. In some embodiments, the microcapillary array comprises at least 900,000 microcapillaries. In some embodiments, the microcapillary array comprises at least 1,000,000 microcapillaries. In some embodiments, the microcapillary array comprises at least 2,000,000 microcapillaries. In some embodiments, the microcapillary array comprises at least 3,000,000 microcapillaries. In some embodiments, the microcapillary array comprises at least 4,000,000 microcapillaries. In some embodiments, the microcapillary array comprises at least 5,000,000 microcapillaries. In some embodiments, the microcapillary array comprises at least 10,000,000 microcapillaries. In some embodiments, the microcapillary array comprises at least 15,000,000 microcapillaries. In some embodiments, the microcapillary array comprises at least 20,000,000 microcapillaries. The number of microcapillaries within an array is preferably chosen in view of the size of the variant protein library to be screened.

The microcavity arrays are about 0.2 mm (200 µm) to about 1 mm thick and about 50 µm to about 200 µm in diameter. In some embodiments, the microcavity arrays are about 1.5 mm thick and about 150 µm in diameter. In some embodiments, the microcavity arrays are about 2 mm thick and about 200 µm in diameter. In some embodiments, the microcavity arrays are about 1 mm thick and about 100 µm in diameter. In some embodiments, the microcavity arrays are about 1 mm thick and about 10 µm in diameter. In some embodiments, the microcavity arrays are about 1 µm, 5 µm, and/or 10 µm in diameter. In some embodiments, the microcavity arrays are about 10 µm in diameter.

A variety of microcavity arrays can find use in the present methods. Exemplary microcavity array sizes are provided herein. In some embodiments, the microcavities within the arrays are about 50 µm to about 200 µm in diameter. In some embodiments, the microcavities within the arrays are about 75 µm to about 150 µm in diameter. In some embodiments, the microcavities within the arrays are about 75 µm to about 125 µm in diameter. In some embodiments, the microcavities within the arrays are about 75 µm to about 110 µm in diameter. In some embodiments, the microcavities within the arrays are about 80 µm to about 110 µm in diameter. In some embodiments, the microcavities within the arrays are about 75 µm to about 150 µm in diameter. In some embodiments, the microcavities within the arrays are about 80 µm, about 90 µm, about 100, or about 110 µm in diameter. In some embodiments, the microcavities within the arrays are about 100 µm in diameter A variety of microcavity arrays can find use in the present methods. Exemplary sample volumes are provided herein. In some embodiments, the sample volume in each microcavity is less than about 500 nL. In some embodiments, the sample volume in each microcavity is about 5 nL to about 500 nL. In some embodiments, the volume in each microcavity is about 5 nL to about 400 nL. In some embodiments, the volume in each microcavity is about 5 nL to about 300 nL. In some embodiments, the volume in each microcavity is about 5 nL to about 200 nL. In some embodiments, the volume in each microcavity is about 5 nL to about 100 nL. In some embodiments, the volume in each microcavity is about 5 nL to about 90 nL. In some embodiments, the volume in each microcavity is about 5 nL to about 80 nL. In some embodiments, the volume in each microcavity is about 5 nL to about 70 nL. In some embodiments, the volume in each microcavity is about 5 nL to about 60 nL. In some embodiments, the volume in each microcavity is about 5 nL to about 50 nL. In some embodiments, the volume in each microcavity is about 5 nL to about 40 nL. In some embodiments, the volume in each microcavity is about 5 nL to about 30 nL. In some embodiments, the volume in each microcavity is about 5 nL to about 20 nL. In some embodiments, the volume in each microcavity is about 5 nL to about 10 nL. In some embodiments, the volume in each microcavity is about 5 nL to about 8 nL. In some embodiments, the volume in each microcavity is about 7 nL to about 8 nL. In some embodiments, the volume in each microcavity is about 7.8 nL. In some embodiments, the volume in each microcavity is about 70 pL to about 100 pL. In some embodiments, the volume in each microcavity is about 70 pL to about 90 pL. In some embodiments, the volume in each microcavity is about 70 pL to about 80 pL. In some embodiments, the volume in each microcavity is about 78.5 pL. In some embodiments, the volume in each microcavity is about 150 fL to about 1000 fL. In some embodiments, the volume in each microcavity is about 200 fL to about 1000 fL. In some embodiments, the volume in each microcavity is about 300 fL to about 1000 fL. In some embodiments, the volume in each microcavity is about 400 fL to about 900 fL. In some embodiments, the volume in each microcavity is about 500 fL to about 800 fL. In some embodiments, the volume in each microcavity is about 150 fL to 200 fL. In some embodiments, the volume in each microcavity is about 157 fL.

In some embodiments, each microcavity in the microcavity arrays of the instant screening methods further comprises an agent or agents to improve viability of the cellular expression system when cellular expression assays are used. Specifically, the agent or agents is included to prevent cell damage during the step of isolating the contents of the microcapillary of interest, for example by a laser pulse (see below). In preferred embodiments, the agent is methylcellulose (for example at 0.001 wt % to 10 wt %), dextran (for example at 0.5 wt % to 10 wt %), pluronic F-68 (for example at 0.01 wt % to 10 wt %), polyethylene glycol ("PEG") (for example at 0.01 wt % to 10 wt %), polyvinyl alcohol ("PVA") (for example at 0.01 wt % to 10 wt %), or the like. Alternatively, or in addition, each microcapillary in the microcapillary arrays of the instant screening methods can further comprise a growth additive, such as, for example, 50% conditioned growth media, 25% standard growth media, or 25% serum. In some embodiments, the conditioned growth media is conditioned for 24 hours. In some embodiments, the added agent is insulin, transferrin, ethanolamine, selenium, an insulin-like growth factor, or a combination of these agents or any of the agents recited above.

It should also be understood that the concentrations of each component of the screening assay within a microcavity can be modulated as desired in an assay in order to achieve an optimal outcome. In particular, it may be desirable to modulate the concentration of proteins, polypeptides, nucleic acids, small molecules, and/or cells to achieve the desired level of association between these components. The level of association will also depend on the particular affinity between these components, wherein a higher affinity results in a higher level of association for a given concentration of the components, and a lower affinity results in a lower level of association of the components for a given concentration. Concentration of various components may likewise be modulated in order to achieve optimum levels of signal output, as would be understood by those of ordinary skill in the art.

V. Microcapillary Flow Cells and Methods of Use

The present invention provides microcapillary array flow cells and methods for lateral loading of solutions into these flow cells, as described herein and shown in the accompanying figures which find use in the high-throughput systems described herein. Such flow cells can comprise the microcapillary array as described under the section "Microcavity Array" provided above.

In some embodiments, a microcapillary array flow cell according to the present invention provides for distributing a fluid to a fluid access region encompassing a chip. In some embodiments, the chip comprises a plurality of microcapillary wells. In some embodiments, the fluid for distribution does not comprise a biomolecule for specific, targeted and/or particular binding to one or more components in the microcapillary well. In some embodiments, a biomolecule includes but is not limited to an antibody, an antibody fragment, a whole cell, a cell fragment, a bacterium, a virus, a viral fragment, and/or a protein. In some embodiments, the fluid for distribution does comprise a reagent. In some embodiments, the fluid for distribution comprises a reagent such as a lysis buffer. In some embodiments, the fluid for distribution comprises a reagent such as a wash buffer. In some embodiments, the fluid for distribution comprises a sample, for example for loading the sample into the microcapillary wells of the microcapillary array flow cell.

In some embodiments, the microcapillary array flow cell comprises several different features. In some embodiments, the microcapillary array flow cell comprises i) a height limiting support member comprising a fluid inlet hole, a fluid outlet hole, and an air vent hole in fluid communication, ii) an alignment member in fluid communication with i) and whose upper surface is lower than said chip comprising said plurality of microcapillary wells, iii) a sealing gasket in fluid communication with iii), wherein said sealing gasket encompasses said plurality of microcapillary wells, and iv) a base layer in fluid communication with iv) and which comprises the bottom planar surface, wherein said microcapillary wells are open to at least one planar surface, wherein said fluid is distributed in a lateral path perpendicular to said microcapillary wells, wherein the exit pressure of the fluid from the outlet hole at the bottom planar surface is lower than the surface tension of water or lower than the capillary pressure, and wherein said fluid is distributed into said microcapillary wells. In some embodiments, the exit pressure of the fluid from the outlet hole at the bottom planar surface is lower than the surface tension of water. In some embodiments, the exit pressure of the fluid from the outlet hole at the bottom planar surface is lower than the capillary pressure.

Figures 4A, 4B:
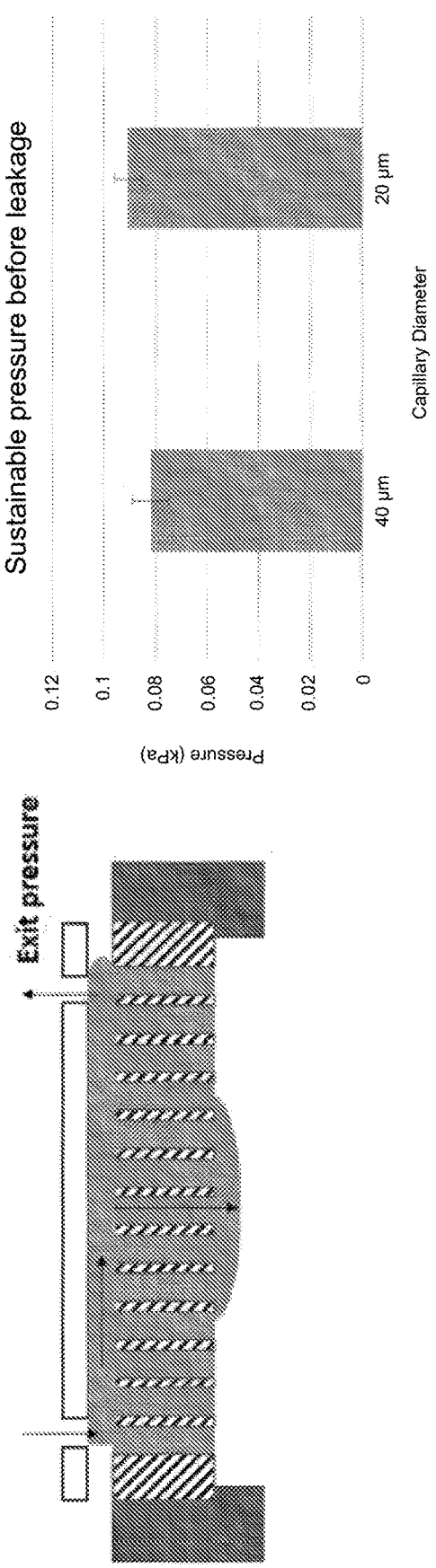
FIG. 4A-FIG. 4B: A) Provides a schematic of the two pump system used as part of the lateral flow method and system. B) Provides a graph regarding the sustainable pressure before leakage. If exit pressure is higher than surface tension of water at the bottom, the liquid will leak out the bottom.
Figure 5:
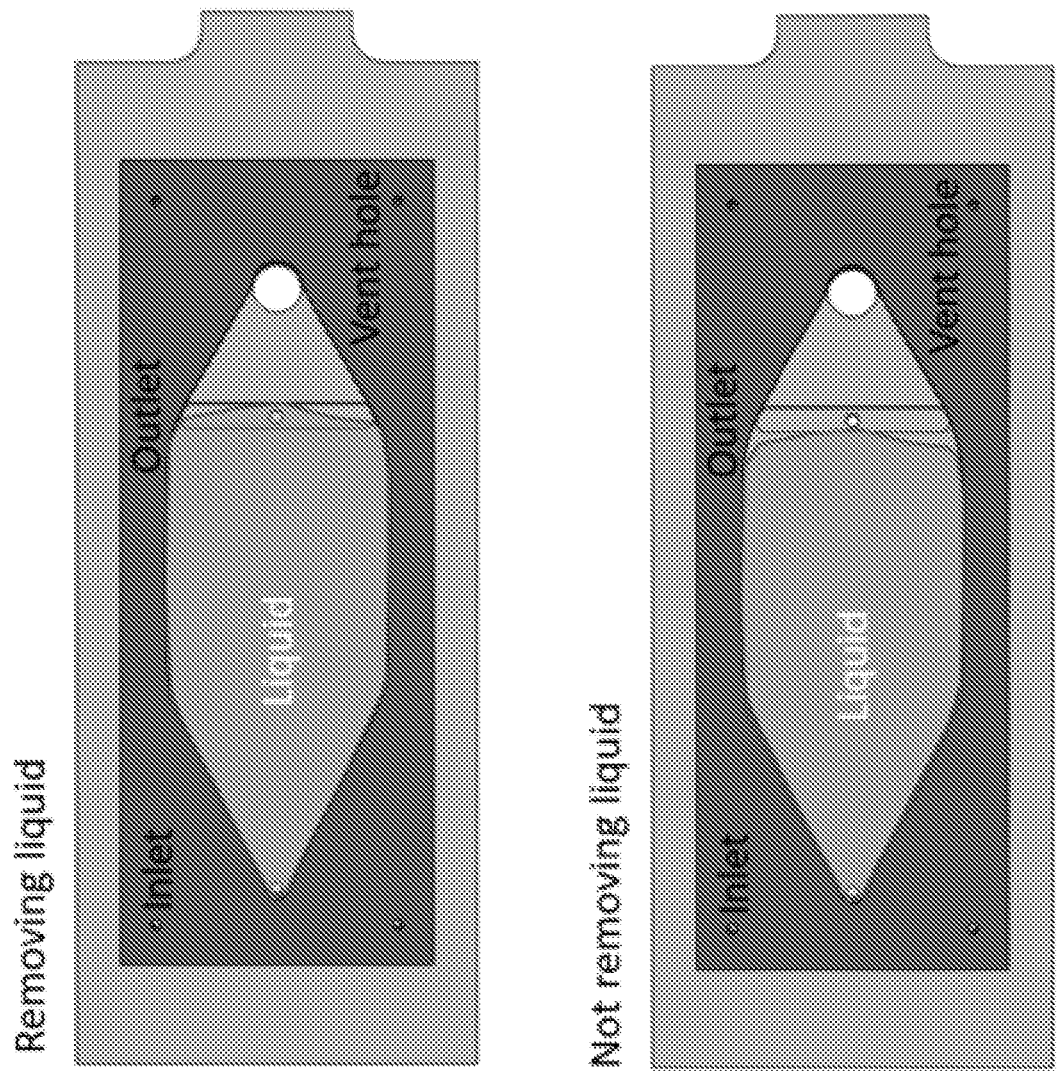
FIG. 5: Provides a schematic of the flow cell when removing and not removing liquid, and the placement of the air vent for the outlet pump, such that it will only remove liquid touching the outlet hole.
Figure 6:
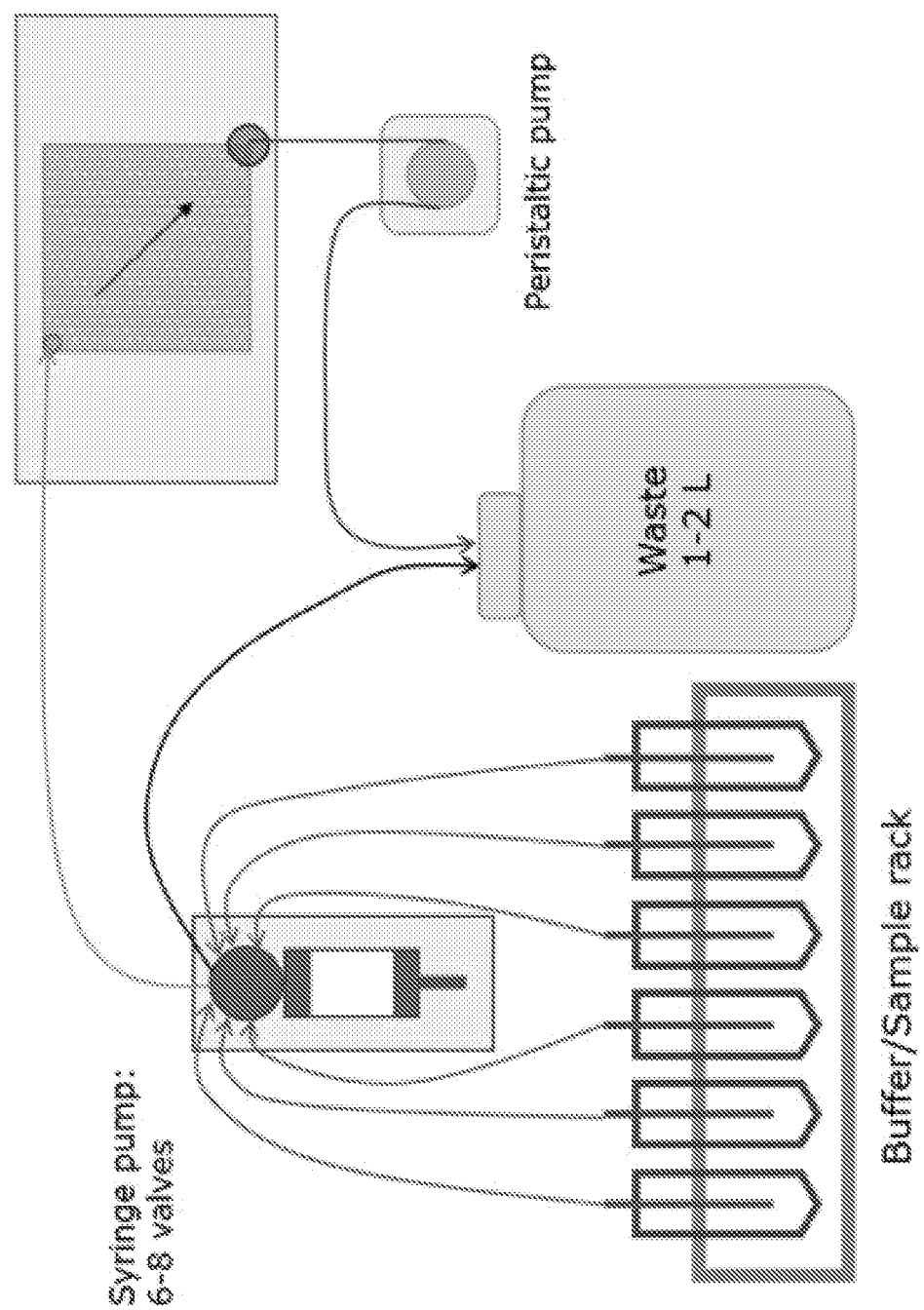
FIG. 6: Provides a fluidics pathway schematic for the system.
Figure 8A:
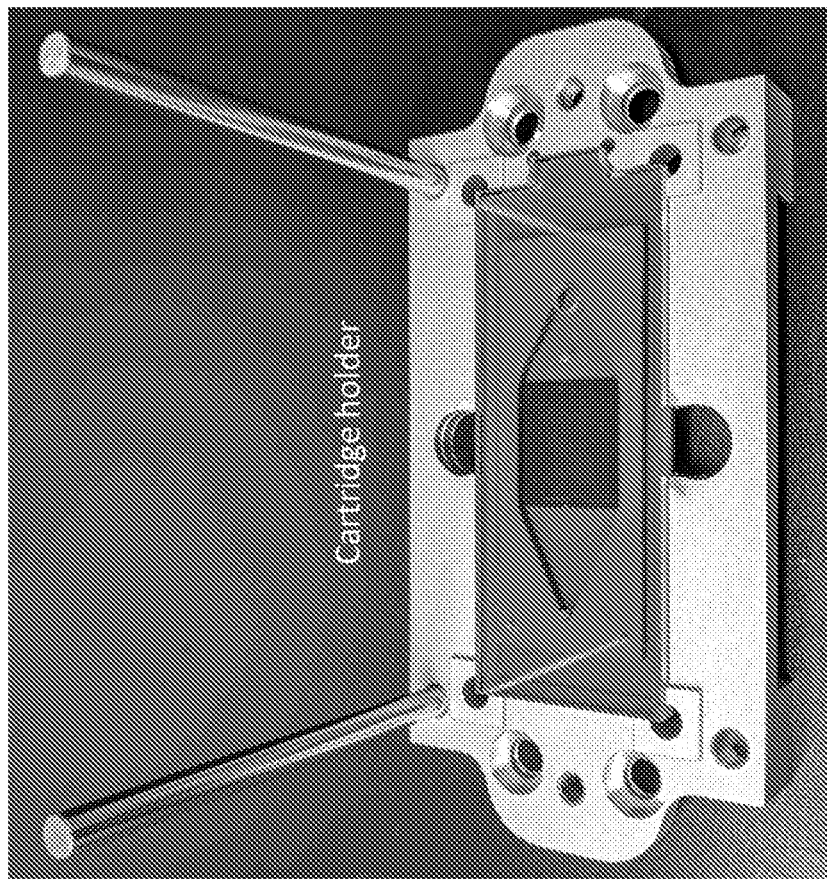
FIG. 8A-FIG. 8B: Provides photos of the A) cartridge holder and B) the inlet pump placement.
Figure 8B:
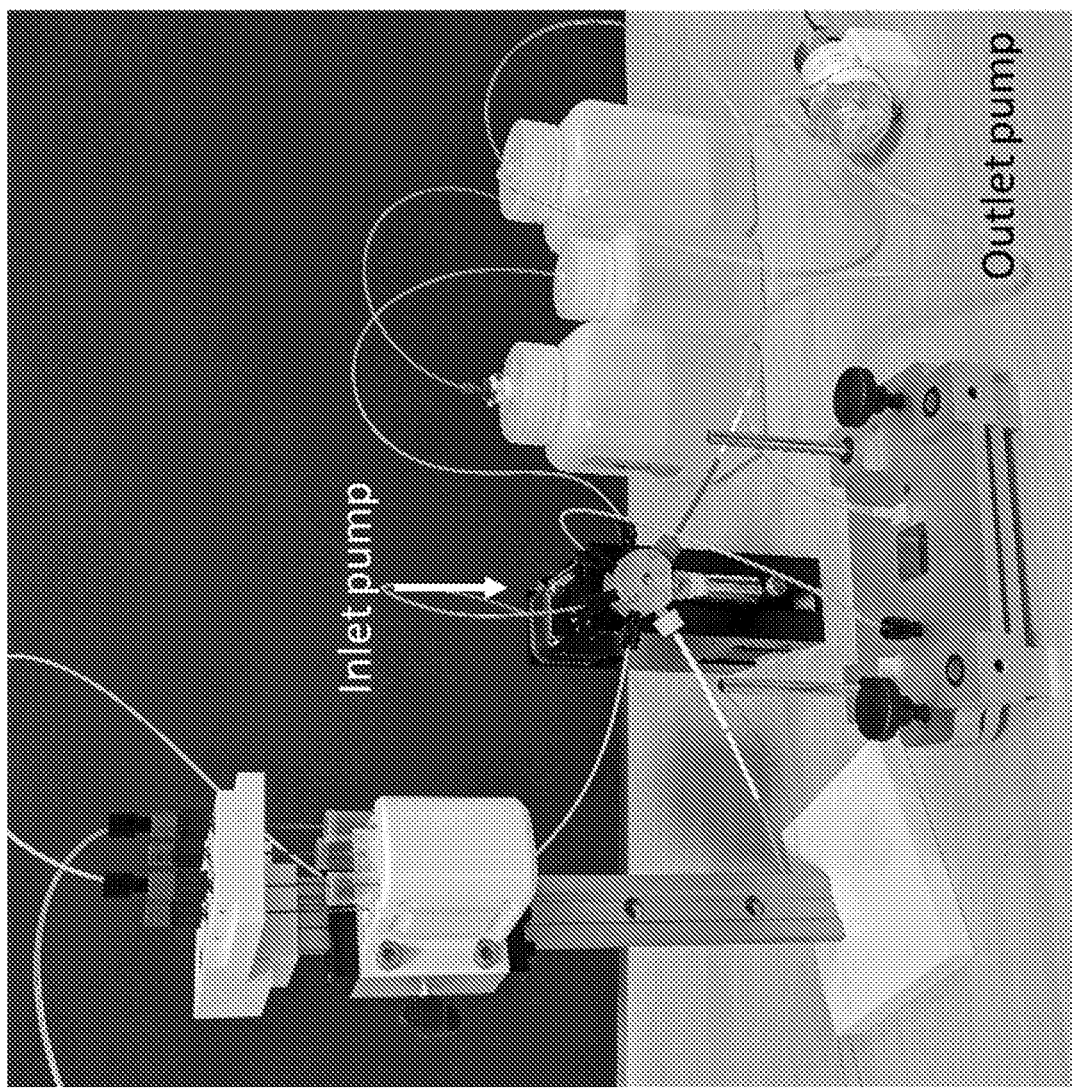
Figure 9:
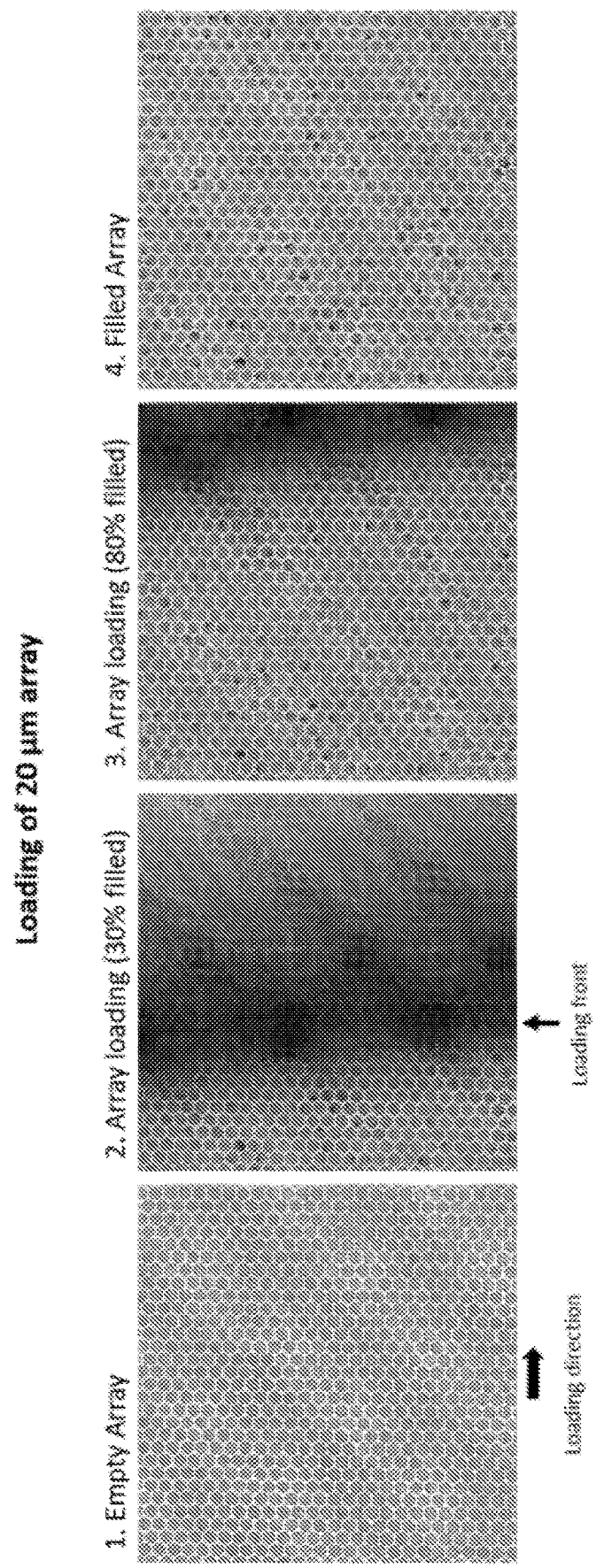
FIG. 9: Provides data showing loading of a 20 μm array using the flow cell.
Figure 10:
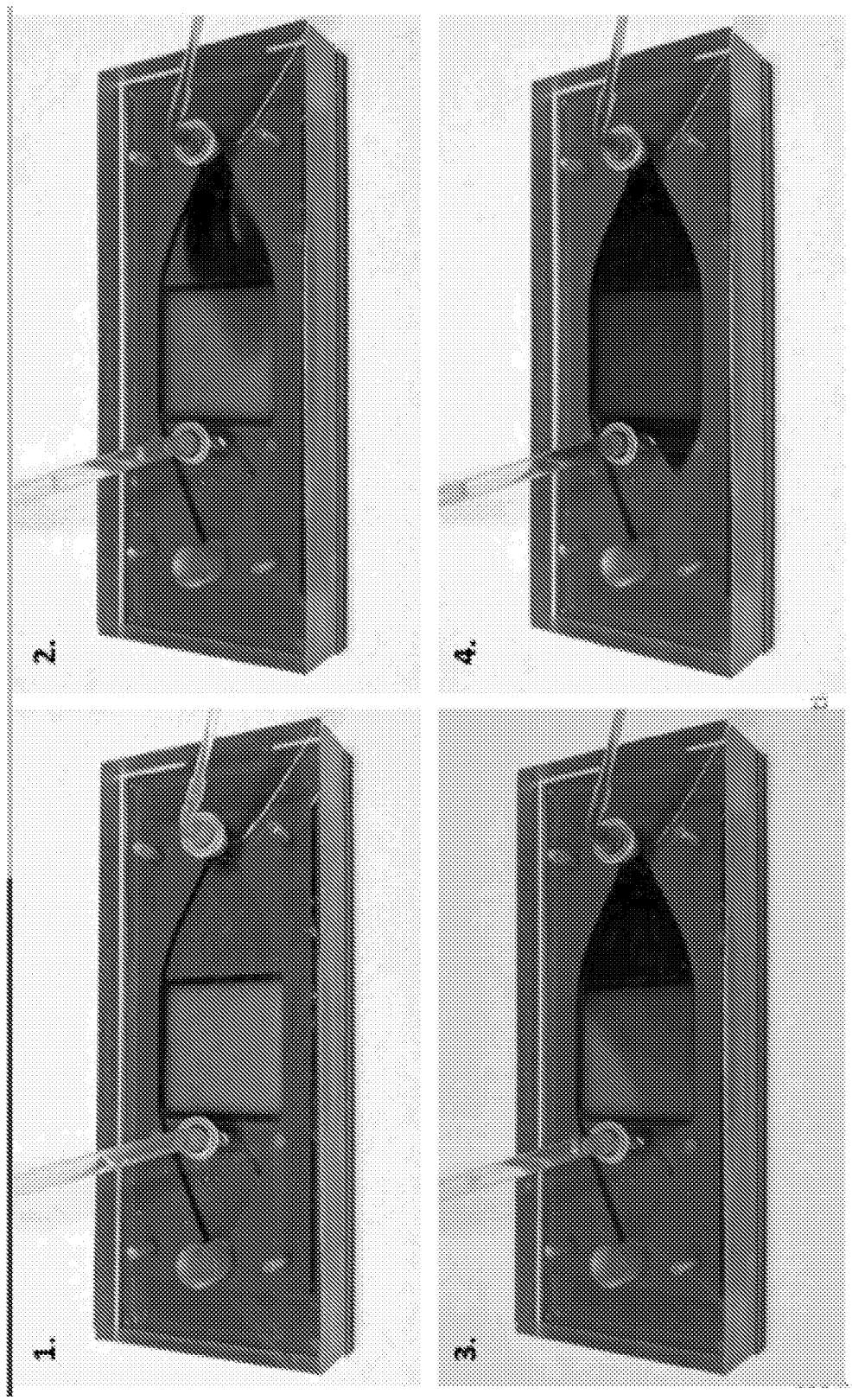
FIG. 10: Provides data showing fluid exchange from the top. Exchange fluids on top: Addition of substrate (blue).
Figure 11:
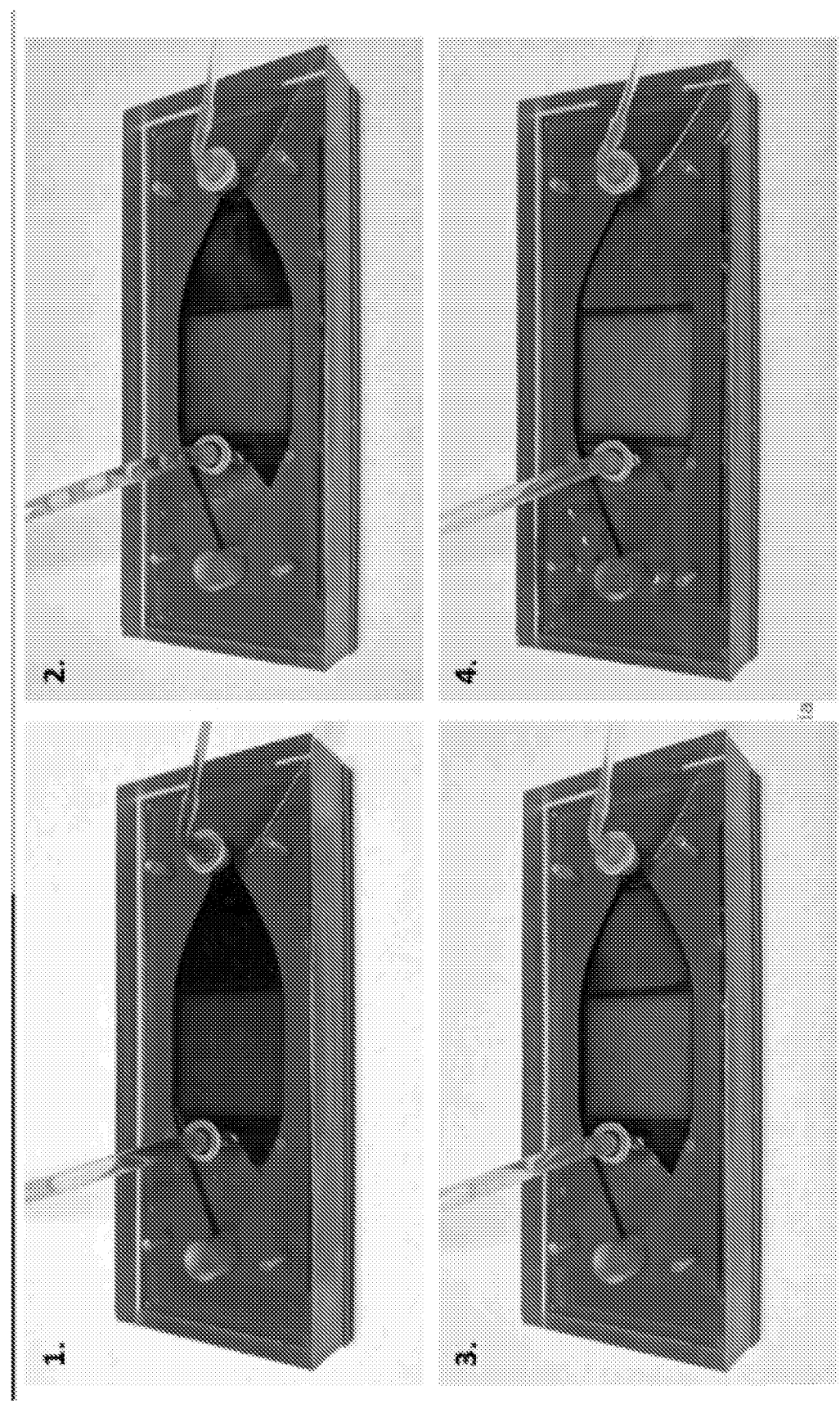
FIG. 11: Provides data showing fluid exchange from the top. Exchange fluids on top: removal of substrate (blue).
Figure 13:
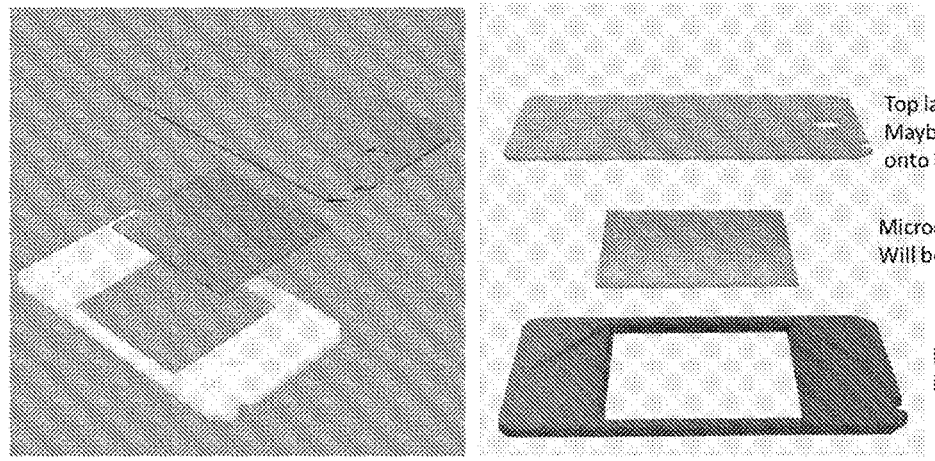
FIG. 13: Provides a schematic of an additional flow cell concept.
Figure 14:
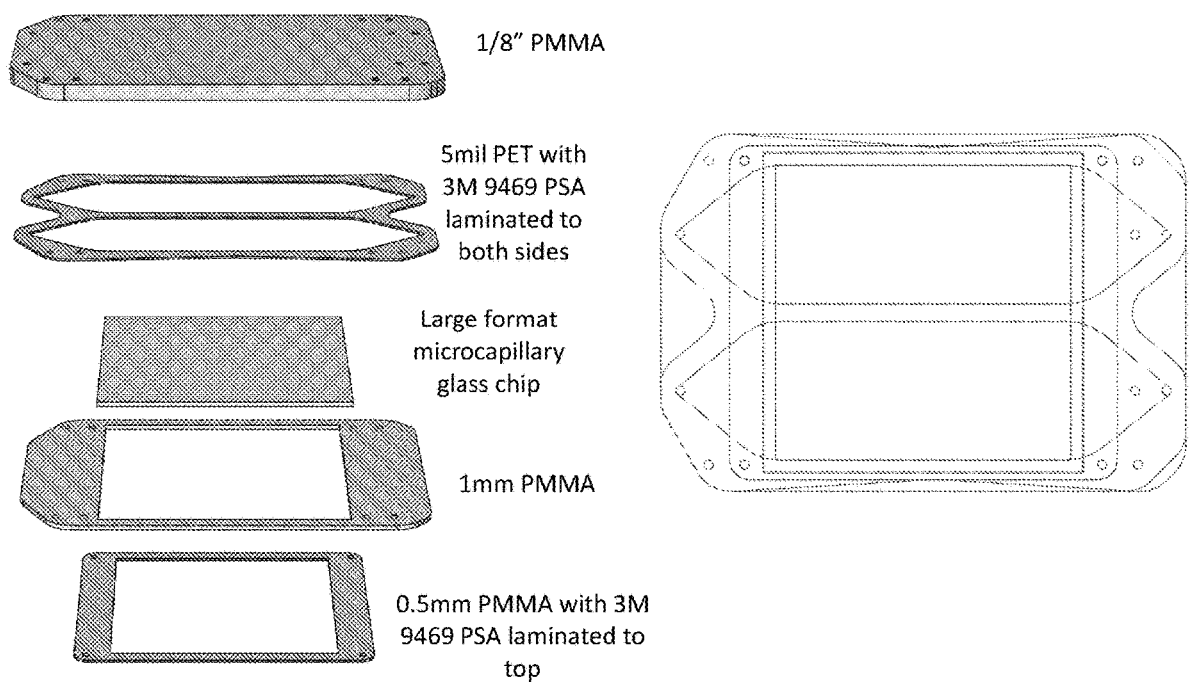
FIG. 14: Provides a schematic of flow cells for 1 large (52 mm×52 mm) array. To properly distribute the liquid, a single array was divided into 2 flow paths.
Figure 15:
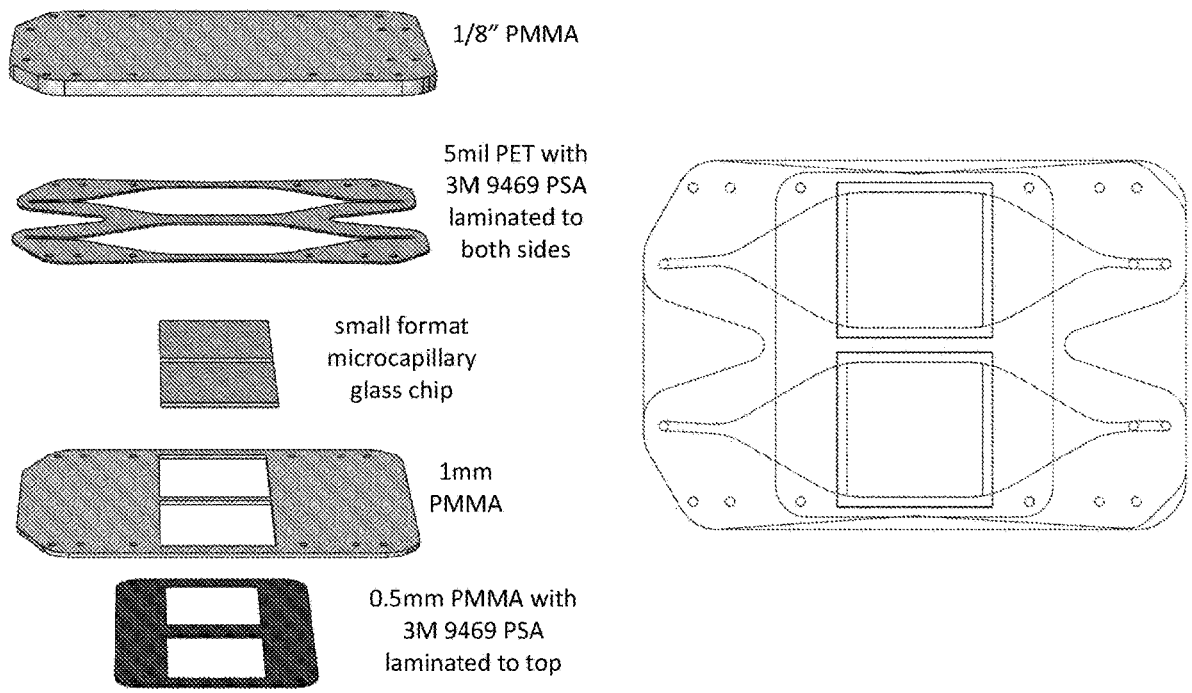
FIG. 15: Provides a schematic of flow cells for 2 small (25 mm×25 mm) arrays. To properly distribute the liquid, a single array was divided into 2 flow paths.
Figure 16:
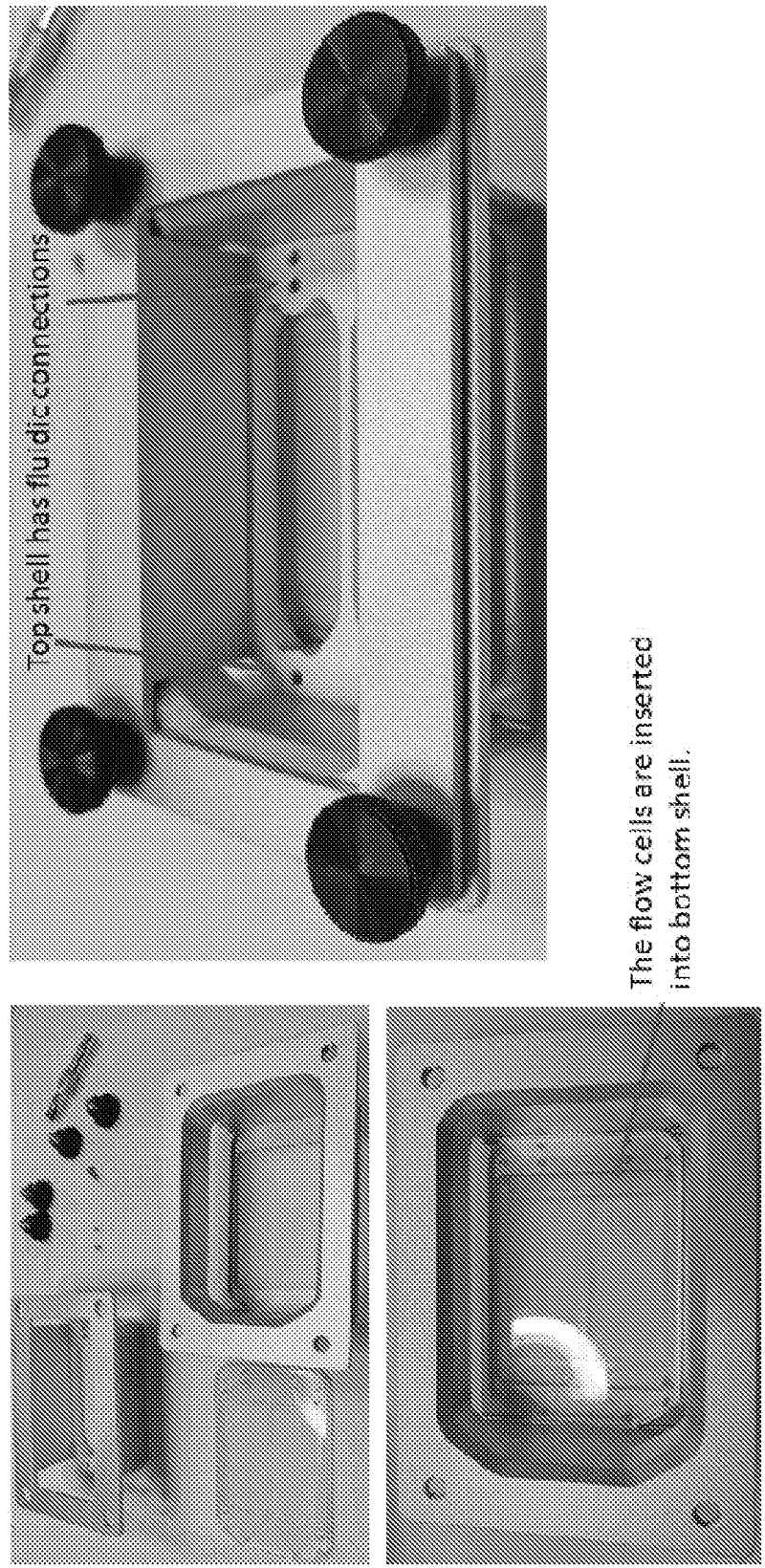
FIG. 16: Provides an overview of the fluidic manifold assembly.

In some embodiments, the microcapillary array flow cell comprises several different features. In some embodiments, the microcapillary array flow cell comprises i) a height limiting support member comprising a fluid inlet hole, a fluid outlet hole, and an air vent hole in fluid communication, ii) an alignment member in fluid communication with i) and whose upper surface is lower than said chip comprising said plurality of microcapillary wells, iii) a sealing gasket in fluid communication with iii), wherein said sealing gasket encompasses said plurality of microcapillary wells, and iv) a base layer in fluid communication with iv) and which comprises the bottom planar surface, wherein said microcapillary wells are open to at least one planar surface, wherein said fluid is distributed in a lateral path perpendicular to said microcapillary wells, wherein the exit fluidic resistance is lower than the liquid surface tension in the microcapillary well, and wherein said fluid is distributed into said microcapillary wells. In some embodiments, the lowest resistance is the outlet resistance and the fluid flows the correct path (e.g., through the flow path and into the microcapillary wells, as provided in for example, in the figures, particularly FIGS. 1, 4, and 9-10) and does not flow out the microcapillary array flow cell base layer or bottom layer.

In some embodiments, the fluid inlet hole facilitates fluid distribution into said microcapillary wells. In some embodiments, the fluid outlet hole facilitates fluid distribution into said microcapillary wells. In some embodiments, the air vent hole facilitates fluid distribution into said microcapillary wells. In some embodiments, the fluid inlet hole, the fluid outlet hole, and the air vent hole facilitate fluid distribution into said microcapillary wells.

In some embodiments, the microcapillary wells are open to two planar surfaces. In some embodiments, the microcapillary wells are through holes. In some embodiments, the microcapillary wells are through holes open to two planar surfaces.

In some embodiments, the fluid in the microcapillary array flow cell is held in the microcapillary wells by surface tension. In some embodiments, the surface tension is the only force holding the fluid in the microcapillary wells.

In some embodiments, the height limiting support member is located about 0.05 mm to about 10 mm above said chip comprising said plurality of microcapillary wells.

In some embodiments, the height limiting support member is located about 0.05 mm to about 9 mm above said chip comprising said plurality of microcapillary wells. In some embodiments, the height limiting support member is located about 0.05 mm to about 8 mm above said chip comprising said plurality of microcapillary wells. In some embodiments, the height limiting support member is located about 0.05 mm to about 7 mm above said chip comprising said plurality of microcapillary wells. In some embodiments, the height limiting support member is located about 0.05 mm to about 6 mm above said chip comprising said plurality of microcapillary wells. In some embodiments, the height limiting support member is located about 0.05 mm to about 5 mm above said chip comprising said plurality of microcapillary wells. In some embodiments, the height limiting support member is located about 0.05 mm to about 4 mm above said chip comprising said plurality of microcapillary wells. In some embodiments, the height limiting support member is located about 0.05 mm to about 3 mm above said chip comprising said plurality of microcapillary wells. In some embodiments, the height limiting support member is located about 0.05 mm to about 2 mm above said chip comprising said plurality of microcapillary wells. In some embodiments, the height limiting support member is located about 0.05 mm to about 1 mm above said chip comprising said plurality of microcapillary wells. In some embodiments, the height limiting support member is located about 0.1 mm to about 10 mm above said chip comprising said plurality of microcapillary wells. In some embodiments, the height limiting support member is located about 0.1 mm to about 9 mm above said chip comprising said plurality of microcapillary wells. In some embodiments, the height limiting support member is located about 0.1 mm to about 8 mm above said chip comprising said plurality of microcapillary wells. In some embodiments, the height limiting support member is located about 0.1 mm to about 7 mm above said chip comprising said plurality of microcapillary wells. In some embodiments, the height limiting support member is located about 0.1 mm to about 6 mm above said chip comprising said plurality of microcapillary wells. In some embodiments, the height limiting support member is located about 0.1 mm to about 5 mm above said chip comprising said plurality of microcapillary wells. In some embodiments, the height limiting support member is located about 0.1 mm to about 4 mm above said chip comprising said plurality of microcapillary wells. In some embodiments, the height limiting support member is located about 0.1 mm to about 3 mm above said chip comprising said plurality of microcapillary wells. In some embodiments, the height limiting support member is located about 0.1 mm to about 2 mm above said chip comprising said plurality of microcapillary wells. In some embodiments, the height limiting support member is located about 0.1 mm to about 1 mm above said chip comprising said plurality of microcapillary wells. In some embodiments, the height limiting support member is located about 0.5 mm to about 10 mm above said chip comprising said plurality of microcapillary wells. In some embodiments, the height limiting support member is located about 0.5 mm to about 9 mm above said chip comprising said plurality of microcapillary wells. In some embodiments, the height limiting support member is located about 0.5 mm to about 8 mm above said chip comprising said plurality of microcapillary wells. In some embodiments, the height limiting support member is located about 0.5 mm to about 7 mm above said chip comprising said plurality of microcapillary wells. In some embodiments, the height limiting support member is located about 0.5 mm to about 6 mm above said chip comprising said plurality of microcapillary wells. In some embodiments, the height limiting support member is located about 0.5 mm to about 5 mm above said chip comprising said plurality of microcapillary wells. In some embodiments, the height limiting support member is located about 0.5 mm to about 4 mm above said chip comprising said plurality of microcapillary wells. In some embodiments, the height limiting support member is located about 0.5 mm to about 3 mm above said chip comprising said plurality of microcapillary wells. In some embodiments, the height limiting support member is located about 0.5 mm to about 2 mm above said chip comprising said plurality of microcapillary wells. In some embodiments, the height limiting support member is located about 0.5 mm to about 1 mm above said chip comprising said plurality of microcapillary wells. In some embodiments, the height limiting support member is located about 1 mm to about 10 mm above said chip comprising said plurality of microcapillary wells. In some embodiments, the height limiting support member is located about 1 mm to about 9 mm above said chip comprising said plurality of microcapillary wells. In some embodiments, the height limiting support member is located about 1 mm to about 8 mm above said chip comprising said plurality of microcapillary wells. In some embodiments, the height limiting support member is located about 1 mm to about 7 mm above said chip comprising said plurality of microcapillary wells. In some embodiments, the height limiting support member is located about 1 mm to about 6 mm above said chip comprising said plurality of microcapillary wells. In some embodiments, the height limiting support member is located about 1 mm to about 5 mm above said chip comprising said plurality of microcapillary wells. In some embodiments, the height limiting support member is located about 1 mm to about 4 mm above said chip comprising said plurality of microcapillary wells. In some embodiments, the height limiting support member is located about 1 mm to about 3 mm above said chip comprising said plurality of microcapillary wells. In some embodiments, the height limiting support member is located about 1 mm to about 2 mm above said chip comprising said plurality of microcapillary wells. In some embodiments, the height limiting support member is located about 1 mm to about 1 mm above said chip comprising said plurality of microcapillary wells.

In some embodiments, the flow cell may be for a "large" 52 mm×52 mm array. In some embodiments, in order to properly distribute the liquid, the array is divided into two flow paths. In some embodiments, the flow cell comprises (from top to bottom) the following components: a ⅛" PMMA, a 5 mil PET with 3M 9469 PSA laminated to both sides, a large format microcapillary glass chip, a 1 mm PMMA, and a 0.5 mm PMMA with 3M 9469 PSA laminated to the top of the PMMA.

In some embodiments, the flow cell may be for two "small" 25 mm×25 mm arrays. In some embodiments, in order to properly distribute the liquid, the array is divided into two flow paths. In some embodiments, the flow cell comprises (from top to bottom) the following components: a ⅛" PMMA, a 5 mil PET with 3M 9469 PSA laminated to both sides, a small format microcapillary glass chip, a 1 mm PMMA, and a and a 0.5 mm PMMA with 3M 9469 PSA laminated to the top of the PMMA.

In some embodiments, the fluid is pumped into the fluid inlet hole by an inlet pump. In some embodiments, the fluid is pumped out of the fluid outlet hole by an outlet pump. In some embodiments, the fluid is pumped into said fluid inlet hole by an inlet pump and the fluid is pumped out of the fluid outlet hole by an outlet pump. In some embodiments, the pumping rate of the outlet pump is equal to the pumping rate of the inlet pump. In some embodiments, the pumping rate of the outlet pump is faster than the pumping rate of the inlet pump. In some embodiments, the pumping rate of the outlet pump is one-fold, two-fold, three-fold, or four-fold faster than the pumping rate of the inlet pump. In some embodiments, the pumping rate of the outlet pump is one-fold faster than the pumping rate of the inlet pump. In some embodiments, the pumping rate of the outlet pump is two-fold faster than the pumping rate of the inlet pump. In some embodiments, the pumping rate of the outlet pump is three-fold faster than the pumping rate of the inlet pump. In some embodiments, the pumping rate of the outlet pump is four-fold faster than the pumping rate of the inlet pump.

In some embodiments, a first fluid for distribution is pumped into said inlet hole, followed sequentially by pumping in a second fluid for distribution. In some embodiments, 1 to 4 volumes of the second fluid for distribution is pumped into said inlet hole. In some embodiments, 1 to 3 volumes of the second fluid for distribution is pumped into said inlet hole. In some embodiments, 1 volume of the second fluid for distribution is pumped into said inlet hole. In some embodiments, 2 volumes of the second fluid for distribution is pumped into said inlet hole. In some embodiments, 3 volumes of the second fluid for distribution is pumped into said inlet hole. In some embodiments, 4 volumes of the second fluid for distribution is pumped into said inlet hole. In some embodiments, the second fluid is exchanged at least about 90%, at least about at least about 92%, at least about 95%, at least about 98%, at least about 99%, at least about 99.9% or at least about 100%. In some embodiments, the first fluid for distribution is completely exchanged (e.g., completely replaced) with the second fluid for distribution. In some embodiments, the fluid exchange over the surface (e.g., in the flow path) occurs in about 30 seconds, 1 minute, 90 seconds, or about 2 minutes. In some embodiments, the fluid exchange over the surface (e.g., in the flow path) occurs in about 1 minute. In some embodiments, the liquid within the microcapillary array well is exchanged by diffusion. In some embodiments, the liquid within the microcapillary array well is exchanged by diffusion which occurs over about 15 minutes, about 20 minutes, about 25 minutes, about 30 minutes, or about 35 minutes.

In some embodiments, the second fluid for distribution is pumped into said inlet hole, a third fluid for distribution is pumped into said inlet hole. In some embodiments, 1 to 4 volumes of the third fluid for distribution is pumped into said inlet hole. In some embodiments, 1 to 3 volumes of the third fluid for distribution is pumped into said inlet hole. In some embodiments, 1 volume of the third fluid for distribution is pumped into said inlet hole. In some embodiments, 2 volumes of the third fluid for distribution is pumped into said inlet hole. In some embodiments, 3 volumes of the third fluid for distribution is pumped into said inlet hole. In some embodiments, 4 volumes of the third fluid for distribution is pumped into said inlet hole. In some embodiments, the third fluid is exchanged at least about 90%, at least about at least about 92%, at least about 95%, at least about 98%, at least about 99%, at least about 99.9% or at least about 100%. In some embodiments, the second fluid for distribution is completely exchanged (e.g., completely replaced) with the third fluid for distribution. In some embodiments, the fluid exchange over the surface (e.g., in the flow path) occurs in about 30 seconds, 1 minute, 90 seconds, or about 2 minutes. In some embodiments, the fluid exchange over the surface (e.g., in the flow path) occurs in about 1 minute. In some embodiments, the liquid within the microcapillary array well is exchanged by diffusion. In some embodiments, the liquid within the microcapillary array well is exchanged by diffusion which occurs over about 15 minutes, about 20 minutes, about 25 minutes, about 30 minutes, or about 35 minutes.

In some embodiments, the volume over the flow cell can range from about 100 uL to about 10 mL. In some embodiments, the volume over the flow cell can range from about 1 mL to about 10 mL. In some embodiments, the volume over the flow cell can range from about 1 mL to about 9 mL. In some embodiments, the volume over the flow cell can range from about 1 mL to about 8 mL. In some embodiments, the volume over the flow cell can range from about 1 mL to about 7 mL. In some embodiments, the volume over the flow cell can range from about 1 mL to about 6 mL. In some embodiments, the volume over the flow cell can range from about 1 mL to about 5 mL. In some embodiments, the volume over the flow cell can range from about 1 mL to about 4 mL. In some embodiments, the volume over the flow cell can range from about 1 mL to about 3 mL. In some embodiments, the volume over the flow cell can range from about 1 mL to about 2 mL. In some embodiments, the volume over the flow cell can range from about 100 uL to about 1 mL. In some embodiments, the volume over the flow cell can range from about 100 uL to about 750 uL. In some embodiments, the volume over the flow cell can range from about 100 uL to about 500 uL. In some embodiments, the volume over the flow cell can range from about 100 uL to about 250 uL. In some embodiments, the volume over the flow cell can range from about 250 uL to about 1 mL. In some embodiments, the volume over the flow cell can range from about 250 uL to about 750 uL. In some embodiments, the volume over the flow cell can range from about 250 uL to about 500 uL.

In some embodiments, the inlet pump flow rates can be up to about 1 mL/min to about 5 mL/min. In some embodiments, the inlet pump flow rates can be up to about 5 mL/min. In some embodiments, the inlet pump flow rates can be up to about 4 mL/min. In some embodiments, the inlet pump flow rates can be up to about 3 mL/min. In some embodiments, the inlet pump flow rates can be up to about 2 mL/min. In some embodiments, the inlet pump flow rates can be up to about 1 mL/min.

According to the present invention, a syringe pump can be employed as the inlet pump. In some embodiments, the inlet pump is a syringe pump. In some embodiments, the flow rate of the syringe pump is determined by the following formula:

$$Q = vS$$

where Q is the flow rate, v the speed of the piston and S its cross-section

In some embodiments, the inlet pump is a TriContinent Syringe pump.

According to the present invention, a peristaltic pump can be employed as the outlet pump. In some embodiments, the outlet pump is a peristaltic pump.

In some embodiments, the flow rate of the syringe pump is determined by the following formula:

Theoretical flow rate (ml/min)=$V*L*N*$RPM     FORMULA

Where, V=Volume of tubing (mm^3/mm)
L=Tubing length that will be occluded by pump rollers (mm)
N=Number of rollers on the rotor. RPM=pump rpm In some embodiments, the outlet pump is a Welco peristaltic pump.

In some embodiments, the fluid distribution occurs at a flow rate of about 1 µL/min to about 10 mL/second. In some embodiments, the fluid distribution occurs at a flow rate of about 1 mL/min to about 1 mL/second. In some embodiments, the fluid distribution occurs at a flow rate of about 0.5 mL/min to about 1 mL/second. In some embodiments, the fluid distribution occurs at a flow rate of about 1 mL/min to about 0.5 mL/second. In some embodiments, the fluid distribution occurs at a flow rate of about 0.5 mL/min to about 0.5 mL/second. In some embodiments, the fluid distribution occurs at a flow rate of about 0.25 mL/min to about 0.5 mL/second. In some embodiments, the fluid distribution occurs at a flow rate of about 0.5 mL/min to about 0.25 mL/second. In some embodiments, the fluid distribution occurs at a flow rate of about 1 mL/min to about 0.25 mL/second. In some embodiments, the fluid distribution occurs at a flow rate of about 0.25 mL/min to about 1 mL/second. In some embodiments, the fluid distribution occurs at a flow rate of about 1 mL/min. In some embodiments, the fluid distribution occurs at a flow rate of about 0.9 mL/min. In some embodiments, the fluid distribution occurs at a flow rate of about 0.8 mL/min. In some embodiments, the fluid distribution occurs at a flow rate of about 0.7 mL/min. In some embodiments, the fluid distribution occurs at a flow rate of about 0.6 mL/min. In some embodiments, the fluid distribution occurs at a flow rate of about 0.5 mL/min. In some embodiments, the fluid distribution occurs at a flow rate of about 0.4 mL/min. In some embodiments, the fluid distribution occurs at a flow rate of about 0.3 mL/min. In some embodiments, the fluid distribution occurs at a flow rate of about 0.2 mL/min. In some embodiments, the fluid distribution occurs at a flow rate of about 0.1 mL/min. In some embodiments, the fluid distribution occurs at a flow rate of about 1 mL/60 seconds to about 1 mL/second. In some embodiments, the fluid distribution occurs at a flow rate of about 1 mL/55 seconds to about 1 mL/second. In some embodiments, the fluid distribution occurs at a flow rate of about 1 mL/50 seconds to about 1 mL/second. In some embodiments, the fluid distribution occurs at a flow rate of about 1 mL/45 seconds to about 1 mL/second. In some embodiments, the fluid distribution occurs at a flow rate of about 1 mL/40 seconds to about 1 mL/second. In some embodiments, the fluid distribution occurs at a flow rate of about 1 mL/35 seconds to about 1 mL/second. In some embodiments, the fluid distribution occurs at a flow rate of about 1 mL/30 seconds to about 1 mL/second. In some embodiments, the fluid distribution occurs at a flow rate of about 1 mL/25 seconds to about 1 mL/second. In some embodiments, the fluid distribution occurs at a flow rate of about 1 mL/20 seconds to about 1 mL/second. In some embodiments, the fluid distribution occurs at a flow rate of about 1 mL/15 seconds to about 1 mL/second. In some embodiments, the fluid distribution occurs at a flow rate of about 1 mL/10 seconds to about 1 mL/second. In some embodiments, the fluid distribution occurs at a flow rate of about 1 mL/5 seconds to about 1 mL/second.

In some embodiments, the fluid distribution occurs at a flow rate of about 1 µL/min to about 9 mL/second. In some embodiments, the fluid distribution occurs at a flow rate of about 1 µL/min to about 8 mL/second. In some embodiments, the fluid distribution occurs at a flow rate of about 1 µL/min to about 7 mL/second. In some embodiments, the fluid distribution occurs at a flow rate of about 1 µL/min to about 6 mL/second. In some embodiments, the fluid distribution occurs at a flow rate of about 1 µL/min to about 5 mL/second. In some embodiments, the fluid distribution occurs at a flow rate of about 1 µL/min to about 4 mL/second. In some embodiments, the fluid distribution occurs at a flow rate of about 1 µL/min to about 3 mL/second. In some embodiments, the fluid distribution occurs at a flow rate of about 1 µL/min to about 2 mL/second. In some embodiments, the fluid distribution occurs at a flow rate of about 1 µL/min to about 1 mL/second. In some embodiments, the fluid distribution occurs at a flow rate of about 1 µL/min to about 10 mL/second. In some embodiments, the fluid distribution occurs at a flow rate of about 1 µL/min to about 10 mL/second.

In some embodiments, the fluid distribution occurs at a maximum pressure of less than 5 PSI. In some embodiments, the fluid distribution occurs at a maximum pressure of less than 4 PSI. In some embodiments, the fluid distribution occurs at a maximum pressure of less than 3 PSI. In some embodiments, the fluid distribution occurs at a maximum pressure of less than 2 PSI. In some embodiments, the fluid distribution occurs at a maximum pressure of less than 1 PSI. In some embodiments, when the fluid distribution occurs at a pressure of equal to or more than 5 PSI, this results in fluid leakage. In some embodiments, fluid distribution occurs at a pressure equal to or above 5 PSI results in fluid leakage.

In some embodiments, the fluid distribution occurs at sufficiently low pressure to avoid fluid leakage. In some embodiments, a sufficiently low pressure to avoid fluid leakage is a pressure lower of about 1 PSI to about 10 PSI. In some embodiments, a sufficiently low pressure to avoid fluid leakage is a pressure lower of about 2 PSI to about 10 PSI. In some embodiments, a sufficiently low pressure to avoid fluid leakage is a pressure lower of about 2 PSI to about 8 PSI. In some embodiments, a sufficiently low pressure to avoid fluid leakage is a pressure lower of about 2 PSI to about 6 PSI. In some embodiments, a sufficiently low pressure to avoid fluid leakage is a pressure lower of about 4 PSI to about 8 PSI. In some embodiments, a sufficiently low pressure to avoid fluid leakage is a pressure lower of about 2 PSI to about 4 PSI. In some embodiments, a sufficiently low pressure to avoid fluid leakage is a pressure lower than about 10 PSI. In some embodiments, a sufficiently low pressure to avoid fluid leakage is a pressure lower than about 9 PSI. In some embodiments, a sufficiently low pressure to avoid fluid leakage is a pressure lower than about 8 PSI. In some embodiments, a sufficiently low pressure to avoid fluid leakage is a pressure lower than about 7 PSI. In some embodiments, a sufficiently low pressure to avoid fluid leakage is a pressure lower than about 6 PSI. In some embodiments, a sufficiently low pressure to avoid fluid leakage is a pressure lower than about 5 PSI. In some embodiments, a sufficiently low pressure to avoid fluid leakage is a pressure lower than about 4 PSI. In some embodiments, a sufficiently low pressure to avoid fluid leakage is a pressure lower than about 3 PSI. In some embodiments, a sufficiently low pressure to avoid fluid leakage is a pressure lower than about 3 PSI. In some embodiments, a sufficiently low pressure to avoid fluid leakage is a pressure lower than about 1 PSI. In some embodiments fluid leakage is considered to occur anytime the fluid for distribution exits the microcapillary flow cell array through any means other than being pumped out through an outlet hole. In some embodiments, fluid leakage is indicative of an erroneous pressure differential. In some embodiments, fluid leakage is indicative of an erroneous flow rate. In some embodiments, when the pressure in the microcapillary flow cell array is too high, or above a threshold pressure, fluid leakage occurs. In some embodiments, when the flow rate of the fluid for distribution in the microcapillary flow cell array is too fast, or above a threshold rate, fluid leakage occurs.

In some embodiments, the exit pressure is less than 0.5 kPa. In some embodiments, the exit pressure is less than 0.4 kPa. In some embodiments, the exit pressure is less than 0.3 kPa. In some embodiments, the exit pressure is less than 0.2 kPa. In some embodiments, the exit pressure is less than 0.1 kPa. In some embodiments, the back pressure is less than 0.5 kPa. In some embodiments, the back pressure is less than 0.4 kPa. In some embodiments, the back pressure is less than 0.3 kPa. In some embodiments, the back pressure is less than 0.2 kPa. In some embodiments, the back pressure is less than 0.1 kPa. In some embodiments, an exit pressure above 0.5 kPa results in fluid leakage.

In some embodiments, the maximum pressure within said microcapillary wells before leaking is calculated by the following formula:

$$F_{capillary} \geq F_{inlet} + F_{outlet} + F_{(gravity, sample)}.$$

$F_{inlet}$ is in the inlet pump pressure. With the $2^{nd}$ pump, $F_{outlet}$ should be ~0.

$$F_{gravity} = \rho g (\pi r^2) * h$$

Where $\rho$ is density, r=capillary diameter, and h=thickness of chip $$F_{capillary} = 2(\pi r) * \gamma * \cos(\theta)$$

For pure water and clean glass, $\theta = 0$, so the formula becomes $$F_{capillary} = 2(\pi r) * \gamma$$

In some embodiments, the fluid for distribution comprises a sample loading buffer. In some embodiments, the fluid for distribution is an aqueous based fluid. In some embodiments, the fluid for distribution comprises an oil phase. In some embodiments, the oil phase is a mineral oil or similar oil.

In some embodiments, the fluid for distribution comprises a sample. In some embodiments, the fluid for distribution comprises a sample, for example for loading the sample into the microcapillary wells of the microcapillary array flow cell.

In some embodiments, the fluid for distribution comprises a wash buffer. In some embodiments, the wash buffer is 1× phosphate buffered saline, or HEPES (4-(2-hydroxyethyl)-1-piperazineethanesulfonic acid) Buffer, or Live Cell Imaging Solution (Invitrogen).

In some embodiments, the fluid for distribution comprises a growth media. In some embodiments, the growth media is comprises a growth media selected from the group consisting of DMEM, RPMI, and IMEM. In some embodiments, the fluid for distribution comprises a growth media. In some embodiments, the growth media comprises a growth media selected from the group consisting of DMEM, RPMI, and IMEM. In some embodiments, the growth media comprises DMEM. In some embodiments, the growth media selected from the group consisting of RPMI. In some embodiments, the growth media selected from the group consisting of IMEM.

In some embodiments, the fluid for distribution comprises a reagent. In some embodiments, the reagent is a lysis buffer. Generally, lysis buffers lyse cells. Two recipes for lysis buffer are 1) 1% v/v NP-40, 20 mM Tris-HCL, 5 mM Sodium Pyrophosphate, 5 mM EDTA; 2) 1% Triton, 20 mM Tris-HCl, 150 mM NaCl, 5 mM Sodium Pyrophosphate, 5 mM EDTA. Detergent/surfactant (Triton/NP-40) can be between 0.005% and 10%. In some embodiments, the reagent is one or more antibodies. Some examples of antibodies include primary antibodies: anti-CD25, anti-CD69 antibodies, anti-CD107a antibodies. Other antibodies include secondary antibodies against Mouse, Human, Rabbit, Rat, Goat, Chicken, Sheep, Guinea pig, Hamster, Bovine, Donkey, Dog, Camelid, Cat, Pig, Non-human primate, and Horse. In some embodiments, the reagent is a fluorescently labeled antibody.

In some embodiments, the microcapillary array flow cell is mounted onto a microscope stage, such as one as described above under the "High-throughput imaging systems section".

In some embodiments, the said microscope stage mounting allows for imaging of said microcapillary array contents. In some embodiments, the said microscope stage mounting allows for collection and/or recover of the microcapillary array contents.

In some embodiments, the microscope stage mounting allows for recovery of said microcapillary array contents with a laser. In some embodiments, the recovered contents comprise cells. In some embodiments, the recovered contents comprise live cells. In some embodiments, the recovered contents comprise dead cells. In some embodiments, the recovered cells can be further analyzed for the presence of one or more nucleic acids. In some embodiments, the recovered cells can be further analyzed for the presence of one or more amino acids.

In some embodiments, the internal diameter of the microcapillary wells is from about 1 µm to about 500 µm. In various embodiments, the internal diameter of each microcapillary in the array ranges from between approximately 1 µm and 500 µm. In some arrays, each microcapillary can have an internal diameter in the range between approximately 1 µm and 300 µm; optionally between approximately 1 µm and 100 µm; further optionally between approximately 1 µm and 75 µm; still further optionally between approximately 1 µm and 50 µm; and still further optionally between approximately 5 µm and 50 µm.

In some microcapillary arrays, the open area of the array comprises up to 90% of the open area (OA), so that, when the pore diameter varies between 1 µm and 500 µm, the number of microcapillaries per cm of the array varies between approximately 460 and over 11 million. In some embodiments, the number of microcapillary wells per cm of said chip comprising said microcapillary wells is about 460 to about 11 million or more. In some microcapillary arrays, the open area of the array comprises about 67% of the open area, so that, when the pore size varies between 1 µm and 500 µm, the number of microcapillaries per square cm of the array varies between approximately 340 and over 800,000. In some embodiments, the number of microcapillaries per square cm of the array is approximately 400; 800; 1000; 2000; 4000; 5000; 10,0000; 25,000; 50,000; 75,000; 100,000; 200,000; 300,000; 400,000; 500,000; 600,000; 700,000; 800,000; 900,000; 1,000,000 or more.

The present invention also provides a method for loading a fluid into a microcapillary well. In some embodiments, the method for loading a fluid into a microcapillary well comprises pumping the fluid for distribution into said fluid inlet hole of the microcapillary array flow cell as described above.

In some embodiments, the method allows for uniform distribution of the fluid for distribution.

In some embodiments, the method allows for exchange of a first fluid for distribution with a second fluid for distribution. In some embodiments, the first fluid for distribution is a sample buffer and the second fluid for distribution is a wash buffer. In some embodiments, the first fluid for distribution is a wash buffer and the second fluid for distribution is a wash buffer.

In some embodiments, the method allows for exchange of a second fluid for distribution with a third fluid for distribution. In some embodiments, the second fluid for distribution is a wash buffer and the third fluid for distribution is a wash buffer.

In some embodiments, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, such that fluid does not leak out of the microcapillary array flow cell.

In some embodiments, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein said fluid distribution occurs at a maximum pressure of less than 5 PSI, such that fluid does not leak out of the microcapillary array flow cell.

In some embodiments, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein said exit pressure is less than 0.5 kPa, such that fluid does not leak out of the microcapillary array flow cell.

In some embodiments, the invention provides a method for distribution of a fluid in a microcapillary array flow cell, wherein said fluid for distribution is pumped into the microcapillary array flow cell at a pressure lower than the pressure for which the fluid is exiting the microcapillary array flow cell, wherein the maximum pressure within said microcapillary wells before leaking is calculated by the following formula:

$$F_{capillary} \geq F_{inlet} + F_{outlet} + F_{(gravity, sample)},$$

such that fluid does not leak out of the microcapillary array flow cell. In some embodiments, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said fluid distribution occurs at a maximum pressure of less than 5 PSI, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said fluid distribution occurs at sufficiently low pressure to avoid fluid leakage, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein said exit pressure is less than 0.5 kPa, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell and wherein the exit pressure of the fluid from an outlet hole is lower than the surface tension of water or lower than the capillary pressure, wherein the maximum pressure within said microcapillary wells before leaking is calculated by the following formula:

$$F_{capillary} \geq F_{inlet} + F_{outlet} + F_{(gravity, sample)}.$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 µL/min to about 10 mL/second, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 µL/min to about 10 mL/second, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 µL/min to about 10 mL/second, wherein said fluid distribution occurs at a maximum pressure of less than 5 PSI, wherein said fluid distribution occurs at sufficiently low pressure to avoid fluid leakage, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 µL/min to about 10 mL/second, wherein said exit pressure is less than 0.5 kPa, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the fluid distribution occurs at a flow rate of about 1 µL/min to about 10 mL/second, wherein the maximum pressure within said microcapillary wells before leaking is calculated by the following formula:

$$F_{capillary} \geq F_{inlet} + F_{outlet} + F_{(gravity, sample)}.$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said exit pressure is less than 0.5 kPa, wherein the fluid is distributed into the microcapillary wells, and wherein the fluid does not leak out of the microcapillary array flow cell. In some embodiments, the exit pressure is the fluidic resistance out of the lateral flow cell outlet.

In some embodiments, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)}.$$

$F_{inlet}$ is in the inlet pump pressure. With the $2^{nd}$ pump, $F_{outlet}$ should be ~0.

$$F_{gravity} = \rho g(\pi r^2) * h$$

Where $\rho$ is density, r=capillary diameter, and h=thickness of chip $$F_{capillary} = 2(\pi r) * \gamma * \cos(\theta)$$

For pure water and clean glass, $\theta=0$, so the formula becomes $$F_{capillary} = 2(\pi r) * \gamma,$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)}.$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein said fluid distribution occurs at sufficiently low pressure to avoid fluid leakage, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein said exit pressure is less than 0.5 kPa, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein said exit pressure is less than 0.5 kPa, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)},$$

wherein said exit pressure is less than 0.5 kPa, wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at a maximum pressure of less than 5 PSI, wherein the maximum pressure within said microcapillary wells before leaking is calculated by the following formula:

$$F_{capillary} \geq F_{inlet} + F_{outlet} + F_{(gravity, sample)},$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein said fluid distribution occurs at sufficiently low pressure to avoid fluid leakage, wherein the maximum pressure within said microcapillary wells before leaking is calculated by the following formula:

$$F_{capillary} \geq F_{inlet} + F_{outlet} + F_{(gravity, sample)},$$

wherein the fluid is distributed into the microcapillary wells, and wherein the fluid does not leak out of the microcapillary array flow cell.

In some embodiments, the invention provides a method for distribution of a fluid in a microcapillary array flow cell, wherein said fluid for distribution is pumped into the microcapillary array flow cell and out of the microcapillary array flow cell, wherein the maximum pressure within said microcapillary wells before leaking is calculated by the following formula:

$$F_{capillary} \geq F_{inlet} + F_{outlet} + F_{(gravity, sample)},$$

wherein said exit pressure is less than 0.5 kPa, wherein the fluid is distributed into the microcapillary wells, and wherein the fluid does not leak out of the microcapillary array flow cell.

VI. Samples and/or Library Components

Libraries that can be screened according to the present methods include any library comprising a plurality of molecules as well as mixtures and/or combinations thereof. In some embodiments, libraries comprise samples comprising biological material. In some embodiments, the library comprises samples comprising a plurality of one or more molecules and/or cells as well as mixtures and/or combinations thereof. In some embodiments, the library comprises samples comprising a plurality of one or more proteins, polypeptides, nucleic acids, small molecules, dyes, and/or cells as well as mixtures and/or combinations thereof. In some embodiments, molecules include any molecule. In some embodiments, molecules include but are not limited to proteins, polypeptides, nucleic acids, small molecules, and/or dyes as well as mixtures and/or combinations thereof. In some embodiments, libraries comprise samples comprising biological materials that comprise polypeptides, nucleic acids, small molecules, and/or cells as well as mixtures and/or combinations thereof. In some embodiments, libraries comprise samples. In some embodiments, samples include but are not limited to biological materials that comprise polypeptides, nucleic acids, small molecules, dyes, and/or cells as well as mixtures and/or combinations thereof. In some embodiments, samples contain a least one molecules and/or cell to be screened. In some embodiments, samples contain a least one to ten molecules and/or cells to be screened as well as mixtures and/or combinations thereof. In some embodiments, samples contain a plurality of molecules and/or cells to be screened as well as mixtures and/or combinations thereof. In some embodiments, the molecule to be screened is termed a target molecule. In some embodiments, the cell to be screened is termed a target cell.

The arrays provided herein allow for screening of libraries made up of proteins, polypeptides, nucleic acid, small molecules, dyes, and/or cells as well as mixtures and/or combinations thereof. In some embodiments, the target molecule to be screened is a protein, polypeptide, nucleic acid, small molecule, dye, carbohydrate, lipid, or a combination of two or more of these target molecules. In some embodiments, the proteins and/or polypeptides are selected from the group consisting of enzymes, ligands, and receptors. For example, in some embodiments the target molecule can be a lipid-modified or glycosylated protein. In some embodiments, the target molecule is a native protein.

As described above, each capillary in the microcavity array used in the instant screening methods will contain different sample components. Such sample components can include, but are not limited to proteins, polypeptides, nucleic acids, small molecules, dyes, and/or cells (i.e., target molecules and/or target cells) as well as mixtures and/or combinations thereof. In some embodiments, the library for screening comprises the variant protein, variant polypeptide, variant nucleic acid, variant small molecule, variant dye, and/or variant cells exhibiting distinguishing characteristics. In some embodiments, the variant protein, variant polypeptide, variant nucleic acid, variant small molecule, variant dye, and/or variant cells exhibit distinguishing characteristics, such that each microcavity comprises a sample that comprises a different target molecule and/or target cell from the sample found in each of the other microcavities within the array. In some embodiments, one or more microcavities within the array comprise a sample that comprises the same target molecule and/or target cell as a sample found in at least one other microcavity within the array (e.g., as duplicates for comparison).

In some embodiments, the proteins and/or polypeptides in the library to be screened in the microcavity array can be variant proteins and/or polypeptides. Variant proteins include proteins and polypeptides which are distinguishable from one another based on at least one characteristic or feature. In some embodiments, the variant proteins and/or polypeptides exhibit different amino acid sequences, exhibit different amino acid sequence lengths, are produced/generated by different methods, exhibit different activities, exhibit different chemical modifications, and/or exhibit different post-translational modifications. In some embodiments, the variant proteins and/or polypeptides exhibit different amino acid sequences. In some embodiments, the variant proteins and/or polypeptides exhibit different amino acid sequence lengths. In some embodiments, the variant proteins and/or polypeptides are produced/generated by different methods. In some embodiments, the variant proteins and/or polypeptides exhibit different activities. In some embodiments, the variant proteins and/or polypeptides exhibit different chemical modifications. In some embodiments, the variant proteins and/or polypeptides exhibit different post-translational modifications. In some embodiments, the variant protein is one of a population of variant proteins and/or polypeptides that is being subjected to the screening method and analyzed using the microcavity arrays disclosed herein. The population of variant proteins and/or polypeptides can be any population of proteins that can be suitably distributed within a microcapillary array.

In some embodiments, the nucleic acids in the library to be screened in the microcavity array can be variant nucleic acids. Variant nucleic acids include nucleic acids which are distinguishable from one another based on at least one characteristic or feature. In some embodiments, the variant nucleic acids have different nucleotide sequences, have different nucleotide sequence lengths, have been produced/generated by different methods, have different methylation patterns, have different chemical modifications, and/or exhibit other distinguishing modifications. In some embodiments, the variant nucleic acids have different nucleotide sequences. In some embodiments, the variant nucleic acids have different nucleotide sequence lengths. In some embodiments, the variant nucleic acids have been produced/generated by different methods. In some embodiments, the variant nucleic acids have different methylation patterns. In some embodiments, the variant nucleic acids have different chemical modifications. In some embodiments, the variant nucleic acids exhibit other distinguishing modifications. In some embodiments, the nucleic acid is one of a population of variant nucleic acids that is being subjected to the screening method and analyzed using the microcavity arrays disclosed herein. The population of variant nucleic acids can be any population of nucleic acids that can be suitably distributed within a microcapillary array.

In some embodiments, the small molecules in the library to be screened in the microcavity array can be variant and/or different small molecules. Variant small molecules include small molecules which are distinguishable from one another based on at least one characteristic or feature. In some embodiments, the variant small molecules have different structures, have been produced/generated by different methods, have different chemical modifications, and/or exhibit other distinguishing different features. In some embodiments, the variant small molecules have different structures. In some embodiments, the variant small molecules have been produced/generated by different methods. In some embodiments, the variant small molecules have different chemical modifications. In some embodiments, the variant small molecules exhibit other distinguishing different features. In some embodiments, the small molecules are derivatives of one another. In some embodiments, the small molecule is one of a population of small molecules that is being subjected to the screening method and analyzed using the microcavity arrays disclosed herein. The population of small molecules can be any population of small molecules that can be suitably distributed within a microcapillary array.

In some embodiments, the cells in the library to be screened in the microcavity array can be variant cells and/or cells of varying types. Variant cells include cells which are distinguishable from one another based on at least one characteristic or feature. In some embodiments, the cells are derived from different samples, are derived from different patients, are derived from different diseases, have different chemical modifications, and/or have been genetically modified. Cells can include eukaryotic and prokaryotic cells. In some embodiments, the cells are derived from different samples. In some embodiments, the cells are derived from different patients. In some embodiments, the cells are derived from different diseases. In some embodiments, the cells have different chemical modifications. In some embodiments, the cells have been genetically modified. In some embodiments, the cells can include human cells, mammalian cells, bacterial cells, and fungal cells, including yeast cells. In some embodiments, the cells can include human cells. In some embodiments, the cells can include mammalian cells. In some embodiments, the cells can include bacterial cells. In some embodiments, the cells can include fungal cells. In some embodiments, the cells can include yeast cells In some embodiments, the cell is one of a population of cells that is being subjected to the screening method and analyzed using the microcavity arrays disclosed herein. The population of cells can be any population of cells that can be suitably distributed within a microcapillary array.

In some embodiments, the population of proteins, polypeptides, nucleic acid, and/or cells is distributed in the microcavity array so that each microcavity comprises a small number of different variant proteins, variant polypeptides, variant nucleic acid, and/or cells. In some embodiments, each microcavity comprises a single different variant protein, variant polypeptide, variant nucleic acid, and/or cell per microcavity. In some embodiments, each microcavity comprises a single different variant protein per microcavity. In some embodiments, each microcavity comprises a single different variant polypeptide per microcavity. In some embodiments, each microcavity comprises a single different variant nucleic acid per microcavity. In some embodiments, each microcavity comprises a single different cell per microcavity. The population of variant proteins, variant polypeptides, variant nucleic acid, and/or cells is chosen in combination with the other components within the composition.

In some embodiments, each microcavity in the microcavity array comprises 0 to 5 different variant proteins, variant polypeptides, variant nucleic acid, and/or cells from the population of variant proteins. In some embodiments, each microcavity in the microcavity array comprises 0 to 4, 0 to 3, 0 to 2, or even 0 to 1 different variant proteins from the population of variant proteins, variant polypeptides, variant nucleic acid, and/or cells.

Accordingly, in some embodiments, the variant proteins are soluble proteins, for example soluble proteins that are secreted by a cellular expression system. Exemplary soluble variant proteins include antibodies and antibody fragments, alternative protein scaffolds, such as disulfide-bonded peptide scaffolds, extracellular domains of cell-surface receptor proteins, receptor ligands, such as, for example, G-protein coupled receptor ligands, other peptide hormones, lectins, and the like. In some embodiments, the variant proteins screened using the instant methods do not need to be covalently attached to the cell or virus that expresses them in order to be identified following a screening assay. Isolation of the contents of the desired microcapillary, followed by propagation of the cell or virus clone responsible for expression of the desired variant protein, thereby enables the identification and characterization of that variant protein. Unlike screening assays where a variant protein of interest is displayed by fusion of the protein to a molecule on the surface of a cell or virus particle, the variant proteins identified in the instant screening methods need not be altered in any way either before or after their identification. The observed activities of the variant proteins in the screens are thus more likely to represent the actual activities of those proteins in their subsequent applications. Not needing to alter variant proteins or polypeptides prior to screening also allows for more efficient screening, saving costs and time for library preparation.

In some embodiments, the variant proteins to be screened are membrane-associated proteins, for example proteins typically associated with the surface of a cell or a viral particle in an expression system. Screening of cell-associated variant proteins may be desirable where the variant protein and its target molecule mediate interactions between two cells within a biological tissue. The ability to screen cell-associated variant proteins may also be desirable in screening for interactions with traditionally "non-druggable" protein targets, such as, for example, G-protein coupled receptors or ion channels. Again, not needing to alter variant proteins or polypeptides prior to screening also allows for more efficient screening, saving costs and time for library preparation.

In some embodiments, the variant nucleic acids to be screened include any nucleic acid or polynucleotide, including nucleic acids or polynucleotides that bind to or interact with proteins. Again, not needing to alter the nucleic acids or polynucleotides prior to screening also allows for more efficient screening, saving costs and time for library preparation.

In some embodiments, the protein to be screened is an antibody, antibody fragment, such as an Fc, or an antibody fusion, including for example Fc fusions. In some embodiments, the antibody or antibody fragment can be labeled.

In some embodiments, the method employs the use of an antibody to bind to the target molecule to be screened. In some embodiments, the antibody is a labeled primary antibody or a labeled secondary antibody as is used to bind to the target molecules. A primary antibody is typically considered to be an antibody that binds directly to an antigen of interest, whereas a secondary antibody is typically considered to be an antibody that binds to a constant region on a primary antibody for purposes of labeling the primary antibody. Accordingly, secondary antibodies are frequently labeled with fluorophores or other detectable labels or are labeled with enzymes that are capable of generating detectable signals. They are generally specific for a primary antibody from a different species. For example, a goat or other animal species may be used to generate secondary antibodies against a mouse, chicken, rabbit, or nearly any primary antibody other than an antibody from that animal species, as is understood by those of ordinary skill in the art. In some embodiments, the labeled antibody is a primary or secondary antibody. In some embodiments, the labeled antibody is a fluorescent antibody or an enzyme-linked antibody.

As would be understood by those of ordinary skill in the art, when a fluorescent antibody, for example is used in the instant screening methods, the signal emitted by any excess reporter element remaining free in solution (i.e., either not bound to a variant protein or bound to a variant protein that is not bound to a target molecule) within the microcavity should not be so high that it overwhelms the signal of reporter elements associated with a target molecule via a variant protein (see, e.g., the unassociated fluorescent antibodies). Such background signals can be minimized, however, by limiting the concentration of labeled antibody or other reporter element within the microcapillary solution. In addition, where signals from the screening methods are measured using a fluorescent microscope, configuring the microscope to image a relatively narrow depth of field bracketing the location of the target molecules (e.g., the bottom of the microcapillaries when target cells have settled there by gravitational sedimentation) can minimize the background signal from reporter elements not associated with the target molecule.

VII. Libraries

The number of microcapillaries within an array is generally chosen in view of the size of the library to be screened. In some embodiments, the library size is at least 100,000, at least 300,000, at least 1,000,000, at least 3,000,000, at least 10,000,000, or even more proteins, polypeptides, nucleic acids, small molecules, and/or cells as well as mixtures and/or combinations thereof. In some embodiments, the library comprises at least 100,000 proteins, polypeptides, nucleic acids, small molecules, and/or cells as well as mixtures and/or combinations thereof. In some embodiments, the library comprises at least 200,000 proteins, polypeptides, nucleic acids, small molecules, and/or cells as well as mixtures and/or combinations thereof. In some embodiments, the library comprises at least 300,000 proteins, polypeptides, nucleic acids, small molecules, and/or cells as well as mixtures and/or combinations thereof. In some embodiments, the library array comprises at least 400,000 proteins, polypeptides, nucleic acids, small molecules, and/or cells as well as mixtures and/or combinations thereof. In some embodiments, the library comprises at least 500,000 proteins, polypeptides, nucleic acids, small molecules, and/or cells as well as mixtures and/or combinations thereof. In some embodiments, the library comprises at least 600,000 proteins, polypeptides, nucleic acids, small molecules, and/or cells as well as mixtures and/or combinations thereof. In some embodiments, the library comprises at least 700,000 proteins, polypeptides, nucleic acids, small molecules, and/or cells as well as mixtures and/or combinations thereof. In some embodiments, the library comprises at least 800,000 proteins, polypeptides, nucleic acids, small molecules, and/or cells as well as mixtures and/or combinations thereof. In some embodiments, the library comprises at least 900,000 proteins, polypeptides, nucleic acids, small molecules, and/or cells as well as mixtures and/or combinations thereof. In some embodiments, the library comprises at least 1,000,000 proteins, polypeptides, nucleic acids, small molecules, and/or cells as well as mixtures and/or combinations thereof. In some embodiments, the library comprises at least 2,000,000 proteins, polypeptides, nucleic acids, small molecules, and/or cells as well as mixtures and/or combinations thereof. In some embodiments, the library comprises at least 3,000,000 proteins, polypeptides, nucleic acids, small molecules, and/or cells as well as mixtures and/or combinations thereof. In some embodiments, the library comprises at least 4,000,000 proteins, polypeptides, nucleic acids, small molecules, and/or cells as well as mixtures and/or combinations thereof. In some embodiments, the library comprises at least 5,000,000 proteins, polypeptides, nucleic acids, small molecules, and/or cells as well as mixtures and/or combinations thereof. In some embodiments, the library comprises at least 10,000,000 proteins, polypeptides, nucleic acids, small molecules, and/or cells as well as mixtures and/or combinations thereof. In some embodiments, the library comprises at least 15,000,000 proteins, polypeptides, nucleic acids, small molecules, and/or cells as well as mixtures and/or combinations thereof. In some embodiments, the library comprises at least 20,000,000 proteins, polypeptides, nucleic acids, small molecules, and/or cells as well as mixtures and/or combinations thereof. In some embodiments, the library comprises at least 22,000,000 proteins, polypeptides, nucleic acids, small molecules, and/or cells as well as mixtures and/or combinations thereof. In some embodiments, the library comprises at least 25,000,000 proteins, polypeptides, nucleic acids, small molecules, and/or cells as well as mixtures and/or combinations thereof. In some embodiments, the library comprises at least 50,000,000 proteins, polypeptides, nucleic acids, small molecules, and/or cells as well as mixtures and/or combinations thereof. In some embodiments, the library comprises at least 75,000,000 proteins, polypeptides, nucleic acids, small molecules, and/or cells as well as mixtures and/or combinations thereof. In some embodiments, the library comprises at least 100,000,000 proteins, polypeptides, nucleic acids, small molecules, and/or cells as well as mixtures and/or combinations thereof.

It would be understood by one of skill in the art that each microcavity will typically comprise many multiple copies of the same protein, polypeptide, nucleic acid, small molecule, and/or cell, depending on the source and expression level of the particular protein, polypeptide, nucleic acid, small molecule, and/or cell as well as mixtures and/or combinations thereof. In some embodiments, each microcavity will comprise thousands, tens of thousands, hundreds of thousands, millions, billions, or even more molecules of a particular protein, polypeptide, nucleic acid, small molecule, and/or cell, depending on how the protein, polypeptide, nucleic acid, small molecule, and/or cell is delivered to or expressed within the microcavity as well as mixtures and/or combinations thereof. In some embodiments, one, two, three, four, or more types of protein, polypeptide, nucleic acid, small molecule, and/or cell can be in a sample and/or in the microcavity.

The population of proteins, polypeptides, nucleic acids, and/or small molecules, as well as mixtures and/or combinations thereof, is typically generated using a genetic library in a biological expression system, for example in an in vitro (e.g., cell-free) expression system or in an in vivo or cellular expression system. The population of proteins, polypeptides, nucleic acids, and/or small molecules, as well as mixtures and/or combinations thereof, can also be generated via any known synthesis methods. Exemplary cellular expression systems include, for example, animal systems (e.g., mammalian systems), fungal systems (e.g., yeast systems), bacterial systems, insect systems, or plant systems. In some embodiments, the expression system is a mammalian system or a yeast system. The expression system, whether cellular or cell-free, typically comprises a library of genetic material encoding the population of variant proteins. Cellular expression systems offer the advantage that cells with a desirable phenotype, for example cells that express a particular variant protein of interest, such as a variant protein capable of associating with an immobilized target molecule with high affinity, can be grown and multiplied, thus facilitating and simplifying the identification and characterization of the proteins of interest expressed by the cells.

Genetic libraries encoding large populations of proteins, polypeptides, nucleic acids, and/or small molecules, as well as mixtures and/or combinations thereof, are well known in the art of bioengineering. Such libraries are often utilized in systems relying on the process of directed evolution to identify proteins with advantageous properties, such as high-affinity binding to target molecules, stability, high expression, or particular spectroscopic, e.g., fluorescence, or enzymatic activities. Often the libraries include genetic fusions with sequences from the host expression system, for example fragments of proteins directing subcellular localization, where the expressed population of variant fusion proteins are directed by the targeting fragment to a particular location of the cell or virus particle for purposes of activity screening of the variant protein population. Large numbers of variant proteins, polypeptides, nucleic acids, small molecules, and/or cells (e.g., $10^6$ variants, $10^8$ variants, $10^{10}$ variants, $10^{12}$ variants, or even more variants), as well as mixtures and/or combinations thereof, can be generated using routine bioengineering techniques, as is well known in the art. In some embodiments, the library is purchased from a commercial source.

EXAMPLES

Example 1: Lateral Loading of Microcapillary Arrays for Massively Parallel Enzymatic Reactions This example provides the core principles with regard to lateral loading of microcapillary arrays.

Problem:

Loading samples into through-hole microcapillary arrays is a delicate/difficult process. Samples are only held in place via surface tension, so too much pressure will cause breakage liquid through bottom. Improper loading or sample addition (too high pressure or too fast) will cause leakage through the bottom of the microcapillary array, which ruins the experiment. As such, most experiments have been "single-pot" or homogeneous reactions, which means nothing is added or removed after the initial chip loading. Chip loading was initial performed by swiping or dragging.

Solution

Incorporate microcapillary array into a flow cell, so that fluidics flowed over the top of the microcapillary array to enable:
1. Loading of sample uniformly over the surface
2. Addition or removal/exchanging of buffer/reagent over the surface of the array
3. Addition of non-aqueous phase liquid to seal sample in microcapillary array The final flow cell will be mounted into a microscope stage to enable imaging and still allow the ability to recover samples from the microcapillary with a laser.

Microcapillaries are through-holes. Unlike microwells (for which this flow system would be trivial and common place), there is no bottom with microcapillaries. Moreover, there is a need to enable light passage through for imaging. Also, the bottom must be open to enable laser passage Currently, the bottom of the flow cell is a laminated plastic/rubber piece. However, in the future iterations it could be a single plastic piece and the chip could be epoxied into place.

The top piece has 1 fluidic inlet, 1 fluidic outlet, and one vent hole for air.

The vent hole is required due to our 2 pump system.

Height of flow channel above the chip: 0.05 mm to 10 mm

Two Pump System

Conventional microfluidic systems mostly use 1 pump or pressure source. The pressure gradient drives the fluidic into the inlet, across the chip, and out of the outlet.

However, in our case, we cannot have too high of a pressure gradient: if we do, the liquid will leak through the bottom of the microcapillary.

Surface tension in the microcapillary depends on the diameter:

$$F_{capillary} = 2\pi R \gamma$$

Where R is the radius and the $\gamma$ is the surface tension

The maximum pressure the microcapillary can withstand depends on diameter of the capillary

TABLE 1

Capillary Diameter versus pressure.

| Diameter (μm) | Pressure |
|---|---|
| 20 | 7.3 kPa or 1.06 PSI |
| 40 | 14.6 kPa or 2.12 PSI |

Low maximum pressure: 1-2 PSI

To prevent breakthrough, $F_{capillary} \geq F_{inlet} + F_{outlet} + F_{gravity, sample}$ From measurements, typically have less than 0.5 kPA of back pressure, otherwise sample will leak through bottom.

Solution: one inlet pump to load sample and one outlet pump to remove samples before leakage begins.

Concern: the outlet pump might remove too much liquid, causing air pockets above the microcapillary.

Solution: to have air vent for the outlet pump, such that it will only remove liquid touching the outlet hole.

Pump one (inlet pump): TriContinent Syringe Pump. Flow rates: Min: 1 uL/min; Max: 10 ml/second.

Pump two (outlet pump): Welco peristaltic pump. Maximum pressure: 90 kPa; Standard operation: 60 kPa.

Exemplary Protocols

Load buffer rack, microcapillary array, and recovery slide
  a. Load samples into buffer rack
  b. Load empty microcapillary array into upper stage
  c. Load recovery slide into lower stage Load cells into microcapillary array
  a. Run syringe pump: need to load ~2 ml total, 0.5 ml/min is reasonable Wash flow cell with running buffer to get rid of remaining cells that did not settle into microcapillary
  a. Switch pump intake to running buffer
  b. Run buffer at 0.5 ml/min for ~6 mins (10× volume exchange)

Added enzymatic substrate to cells
  a. Switch pump intake to substrate
  b. Run substrate at 0.5 ml/min for ~6 mins, then pause for 10-30 min Switch back to buffer
  a. Switch pump intake to running buffer
  b. Run buffer at 0.5 ml/min for ~6 mins (10× volume exchange), then run at lowest speed for remaining time Image microcapillary array to find best variants Recovery sample via laser Example 2: Lateral Loading of Microcapillary Arrays for T Cell Surface Activation We can also use this lateral flow cell load T cells into the microcapillaries and then add antibodies to stain for surface makers after cell activation.

Load buffer rack, microcapillary array, and recovery slide
  a. Load sample into buffer rack: T cells+activating antibodies immobilized onto beads in T cell media
  b. Load empty microcapillary array into upper stage
  c. Load recovery slide into lower stage Load sample into microcapillary array
  b. Run syringe pump: need to load ~2 ml total, 0.5 ml/min is reasonable Wash flow cell with running buffer to get rid of remaining cells+beads that did not settle into microcapillary
  c. Switch pump intake to running buffer [1× Phosphate-buffered saline (PBS)+1 g/L bovine serum albumin (BSA)]
  d. Run buffer at 0.5 ml/min for ~6 mins (10× volume exchange)

Incubate flow cell for 24 hours at cell culture conditions (37° C., 5% $CO_2$)

Wash away cell culture media with buffer
  c. Switch pump intake to running buffer
  d. Run buffer at 0.5 ml/min for ~6 mins (10× volume exchange), then run at lowest speed for remaining time Add fluorescently labeled antibody against desired surface maker readout
a. Antibody solution: 1:200 dilution of anti-CD25 antibody, for example CD25 Monoclonal Antibody (CD25-4E3), PE by eBioscience
b. Run buffer at 0.5 ml/min for ~2 mins (2× volume exchange)
c. Incubate for 30 min at room temperature Wash away unbound antibody with buffer
a. Switch pump intake to running buffer
b. Run buffer at 0.5 ml/min for ~6 mins (10× volume exchange), then run at lowest speed for remaining time Image microcapillary array to find best variants Recovery sample via laser Example 3: Additional Exemplary Embodiments Exemplary Embodiment 1: Removal of Growth Media Application need: Growth media often has high background fluorescence, so it was sometimes necessary to wash the sample to remove growth media. After cells were incubated in growth media for 1-72 hr, the media can be removed for improved imaging. One method to wash the sample may be performed by using flow cell to flow in 1× phosphate buffered saline, or HEPES (4-(2-hydroxyethyl)-1-piperazineethanesulfonic acid) Buffer, or Live Cell Imaging Solution (Invitrogen). The results of washing the sample after a 20 minute wash can be seen in FIG. 12.

Exemplary Embodiment 2: Addition of Lysis Buffers

Application need: For some assays, it was necessary to lyse the cells in the microcapillary array. It was important to add in lysis buffers that can lyse the cells but not break the surface tension. Two recipes that may be used for this method are: 1) 1% v/v NP-40, 20 mM Tris-HCL, 5 mM Sodium Pyrophosphate, 5 mM EDTA; 2) 1% Triton, 20 mM Tris-HCl, 150 mM NaCl, 5 mM Sodium Pyrophosphate, 5 mM EDTA. Detergent/surfactant (Triton/NP-40) can be between 0.005% and 10%.

Exemplary Embodiment 3: Addition of Fluorescent Secondary Antibodies

Application Need:

For some assays, there may be a need to incubate for 1-72 hrs without any detection antibodies. After the desired time has passed, the next step is to flow in fluorescently labeled antibodies for measurement. Antibodies that might flow in may be primary antibodies: anti-CD25, anti-CD69 antibodies, anti-CD107a antibodies. Other antibodies that might flow in may be secondary antibodies against Mouse, Human, Rabbit, Rat, Goat, Chicken, Sheep, Guinea pig, Hamster, Bovine, Donkey, Dog, Camelid, Cat, Pig, Non-human primate, and Horse, as needed for the appropriate assay.

The examples set forth above are provided to give those of ordinary skill in the art a complete disclosure and description of how to make and use the embodiments of the compositions, systems and methods of the invention, and are not intended to limit the scope of what the inventors regard as their invention. Modifications of the above-described modes for carrying out the invention that are obvious to persons of skill in the art are intended to be within the scope of the following claims. All patents and publications mentioned in the specification are indicative of the levels of skill of those skilled in the art to which the invention pertains. All references cited in this disclosure are incorporated by reference to the same extent as if each reference had been incorporated by reference in its entirety individually.

All headings and section designations are used for clarity and reference purposes only and are not to be considered limiting in any way. For example, those of skill in the art will appreciate the usefulness of combining various aspects from different headings and sections as appropriate according to the spirit and scope of the invention described herein.

All references cited herein are hereby incorporated by reference herein in their entireties and for all purposes to the same extent as if each individual publication or patent or patent application was specifically and individually indicated to be incorporated by reference in its entirety for all purposes.

Many modifications and variations of this application can be made without departing from its spirit and scope, as will be apparent to those skilled in the art. The specific embodiments and examples described herein are offered by way of example only, and the application is to be limited only by the terms of the appended claims, along with the full scope of equivalents to which the claims are entitled.

What is claimed is:

1. A system for distributing a fluid to a fluid access region of a microcapillary array flow cell, the system comprising:
   a microcapillary array flow cell, the microcapillary array flow cell comprising:
   i) a chip comprising a plurality of microcapillary wells, wherein the microcapillary wells are open on opposing ends;
   ii) a height limiting support member comprising one or more fluid inlet holes, one or more fluid outlet holes, and one or more air vent holes in fluid communication with iii);
   iii) an alignment member in fluid communication with ii) and whose upper surface is lower than said chip comprising said plurality of microcapillary wells;
   iv) a sealing gasket in fluid communication with iii), wherein said sealing gasket encompasses said plurality of microcapillary wells; and
   v) a base layer in fluid communication with iv) and which comprises a bottom planar surface and a base layer opening;
   an inlet pump configured to apply an inlet pressure to the one or more fluid inlet holes;
   an outlet pump configured to apply an exit pressure to the one or more fluid outlet holes; and
   a processor in communication with the inlet pump and outlet pump, the processor configured to set the inlet pressure and the exit pressure to prevent fluid from leaking from the microcapillary wells;
   wherein the base layer opening is positioned such that it is below the lower open ends of the microcapillary wells,
   wherein the microcapillary array flow cell is configured to allow said fluid to be distributed in a lateral path perpendicular to said microcapillary wells.

2. A system for distributing a fluid to a fluid access region of a microcapillary array flow cell, the system comprising:
   a microcapillary array flow cell, the microcapillary array flow cell comprising:
   i) a chip comprising a plurality of microcapillary wells, wherein the microcapillary wells are open on opposing ends;
   ii) a cover comprising one or more fluid inlet holes, one or more fluid outlet holes, and one or more air vent holes in fluid communication with iii);
   iii) a height limiting support member comprising two chambers, each chamber comprising a fluid inlet hole, a fluid outlet hole, and an air vent hole in fluid communication with iv), wherein the two chambers are configured to allow said fluid to be distributed in two lateral paths perpendicular to said microcapillary wells;
   iv) an alignment member in fluid communication with iii) and whose upper surface is lower than said chip comprising said plurality of microcapillary wells; and
   v) a sealing gasket base layer combination in fluid communication with iv), wherein said sealing gasket encompasses said plurality of microcapillary wells, and said bottom of said sealing gasket is laminated to the top of a base layer which comprises a bottom planar surface and a base layer opening, wherein the top of the sealing gasket is in fluid communication with iv);

an inlet pump configured to apply an inlet pressure to the fluid inlet holes;

an outlet pump configured to apply an exit pressure to the fluid outlet holes; and a processor in communication with the inlet pump and outlet pump, the processor configured to set the inlet pressure and the exit pressure to prevent fluid from leaking from the microcapillary wells;

wherein the base layer opening is positioned such that it is below the lower open ends of the microcapillary wells.

3. The system of claim 2, wherein said one or more fluid inlet holes, said one or more fluid outlet holes, and said one or more air vent hole facilitate fluid distribution into said microcapillary wells.

4. The system of claim 2, wherein said fluid is held in the microcapillary wells by surface tension.

5. The system of claim 2, wherein said height limiting support member is located about 0.05 mm to about 10 mm above said chip comprising said plurality of microcapillary wells.

6. The system of claim 2, wherein a first fluid for distribution is pumped into said one or more inlet holes, followed sequentially by pumping in a second fluid for distribution.

7. The system of claim 6, wherein after said second fluid for distribution is pumped into said one or more inlet holes, a third fluid for distribution is pumped into said one or more inlet holes.

8. The system of claim 2, wherein said inlet pump is a syringe pump.

9. The system of claim 2, wherein said inlet pump is a pump selected from the group consisting of Tri Continent Syringe pumps, Piezoelectric Pumps, and Pressure Pumps/Pressure controllers.

10. The system of claim 2, wherein said outlet pump is a peristaltic pump.

11. The system of claim 2, wherein said outlet pump is a pump selected from the group consisting of Welco peristaltic pumps, Piezoelectric Pumps, Pressure Pumps/Pressure controllers, and Vacuum pumps.

12. The system of claim 2, wherein said fluid distribution occurs at a flow rate of about 1 µL/min to about 10 mL/second.

13. The system of claim 2, wherein said fluid distribution occurs at a maximum pressure of less than 5 PSI.

14. The system of claim 2, wherein said fluid distribution occurs at sufficiently low pressure to avoid fluid leakage.

15. The system of claim 2, wherein said exit pressure is less than 0.5 kPa.

16. The system of claim 2, wherein the processor is configured to determine a maximum pressure within said microcapillary wells before leaking in accordance with the following formula:

$$F_{capillary} \geq F_{inlet} + F_{outlet} + F_{(gravity, sample)}$$

17. The system of claim 2, wherein said fluid for distribution comprises a sample loading buffer.

18. The system of claim 2, wherein said fluid for distribution comprises a sample.

19. The system of claim 2, wherein said fluid for distribution comprises a wash buffer.

20. The system of claim 2, wherein said fluid for distribution comprises a reagent.

21. The system of claim 2, wherein said fluid for distribution comprises an oil.

22. The system of claim 2, wherein said fluid for distribution comprises an oil, wherein said oil is distributed across the top of the microcapillary wells and seals the wells.

23. The system of claim 2, wherein said microcapillary array flow cell is configured to be mounted onto a microscope stage.

24. The system of claim 23, wherein said microscope stage mounting allows for imaging of said microcapillary array contents.

25. The system of claim 24, wherein said microscope stage mounting allows for recovery of said microcapillary array contents with the laser.

26. The system of claim 2, wherein the internal diameter of said microcapillary wells is from about 1 µm to about 500 µm.

27. The system of claim 2, wherein the number of microcapillary wells per cm of said chip comprising said microcapillary wells is about 460 to about 11 million or more.

28. A system for distributing a fluid to a fluid access region of a microcapillary array flow cell, the system comprising:

a microcapillary array flow cell, the microcapillary array flow cell comprising:
  i) a chip comprising a plurality of microcapillary wells, wherein the microcapillary wells are open on opposing ends;
  ii) a cover comprising one or more fluid inlet holes, one or more fluid outlet holes, and one or more air vent holes in fluid communication with iii);
  iii) a height limiting support member comprising two chambers, each chamber comprising a fluid inlet hole, a fluid outlet hole, and an air vent hole in fluid communication with iv), wherein the two chambers are configured to allow said fluid to be distributed in two lateral paths perpendicular to said microcapillary wells;
  iv) an alignment member in fluid communication with iii) and whose upper surface is lower than said chip comprising said plurality of microcapillary wells, wherein said chip is divided into one or more sets of microcapillary wells which align with the one or more chambers; and
  v) a sealing gasket base layer combination in fluid communication with iv), wherein said sealing gasket encompasses said plurality of microcapillary wells, and said bottom of said sealing gasket is laminated to the top of a base layer which comprises a bottom planar surface and a base layer opening, wherein the top of the sealing gasket is in fluid communication with iv);

an inlet pump configured to apply an inlet pressure to the fluid inlet holes;

an outlet pump configured to apply an exit pressure to the fluid outlet holes; and a processor in communication with the inlet pump and outlet pump, the processor configured to set the inlet pressure and the exit pressure to prevent fluid from leaking from the microcapillary wells;

wherein the base layer opening is positioned such that it is below the lower open ends of the microcapillary wells, wherein the microcapillary array flow cell is configured to allow said fluid to be distributed into said microcapillary wells.

29. A system for distributing a fluid to a fluid access region of a microcapillary array flow cell, wherein said microcapillary array flow cell comprises:
- a microcapillary array flow cell, the microcapillary array flow cell comprising:
  - i) the chip comprising a plurality of microcapillary wells;
  - ii) a top layer comprising a fluid inlet hole, a fluid outlet hole, and an air vent hole in fluid communication in fluid communication with iii);
  - iii) a middle layer comprising said chip comprising said plurality of microcapillary wells in fluid communication with iv);
  - iv) a base layer in fluid communication with iii) and which comprises a bottom planar surface and a base layer opening and wherein said base layer is sealed to said top layer in ii);
- an inlet pump configured to apply an inlet pressure to the fluid inlet hole;
- an outlet pump configured to apply an exit pressure to the fluid outlet hole; and
- a processor in communication with the inlet pump and outlet pump, the processor configured to set the inlet pressure and the exit pressure to prevent fluid from leaking from the microcapillary wells;
- wherein the base layer opening is positioned such that it is below the lower open ends of the microcapillary wells,
- wherein the microcapillary array flow cell is configured to allow said fluid to be distributed in a lateral path perpendicular to said microcapillary wells.

* * * * *